US007725419B2

(12) United States Patent
Lee et al.

(10) Patent No.: US 7,725,419 B2
(45) Date of Patent: May 25, 2010

(54) PROACTIVE USER INTERFACE INCLUDING EMOTIONAL AGENT

(75) Inventors: Jong-Goo Lee, Seoul (KR); Eyal Toledano, Kiryat Ata (IL); Natan Linder, Motaz Illit (IL); Ran Ben-Yair, Harrey Yehuda (IL); Yariv Eisenberg, Tel-Aviv (IL)

(73) Assignee: Samsung Electronics Co., Ltd (KR)

( * ) Notice: Subject to any disclaimer, the term of this patent is extended or adjusted under 35 U.S.C. 154(b) by 171 days.

(21) Appl. No.: 10/933,582

(22) Filed: Sep. 3, 2004

(65) Prior Publication Data

US 2005/0143138 A1 Jun. 30, 2005

Related U.S. Application Data

(63) Continuation-in-part of application No. 10/743,476, filed on Dec. 23, 2003.

(60) Provisional application No. 60/500,669, filed on Sep. 5, 2003.

(30) Foreign Application Priority Data

Mar. 10, 2004 (KR) ............... 10-2004-0016263
Aug. 27, 2004 (KR) ............... 10-2004-0067663

(51) Int. Cl.
G06F 17/00 (2006.01)
G06N 5/04 (2006.01)

(52) U.S. Cl. ............................................. 706/60

(58) Field of Classification Search ............. 706/1, 706/15, 45, 11, 50, 52, 5, 21; 700/1, 90; 364/419; 709/221, 202; 704/260; 705/14, 705/27, 37, 28; 186/39; 434/236
See application file for complete search history.

(56) References Cited

U.S. PATENT DOCUMENTS 5,367,454 A * 11/1994 Kawamoto et al. .......... 715/706

(Continued)

FOREIGN PATENT DOCUMENTS

JP 09-081632 3/1997

(Continued)

OTHER PUBLICATIONS

'Maintaining Credible Dialogs in a VideoBot System with Special Audio Techniques': DeGroot, 2001, IEEE, Proceedings of the 13th International conference . . . , pp. 351-358.*

(Continued)

*Primary Examiner*—David R Vincent
*Assistant Examiner*—Peter Coughlan
(74) *Attorney, Agent, or Firm*—The Farrell Law Firm, LLP

(57) ABSTRACT

A proactive user interface, installed in (or otherwise control and/or be associated with) any type of computational device. The proactive user interface actively makes suggestions to the user, based upon prior experience with a particular user and/or various preprogrammed patterns from which the computational device could select, depending upon user behavior. These suggestions could be made by altering the appearance of at least a portion of the display, for example by changing a menu or a portion thereof; providing different menus for display; and/or altering touch screen functionality. The suggestions could also be made audibly.

22 Claims, 23 Drawing Sheets

U.S. PATENT DOCUMENTS

| | | | |
|---|---|---|---|
| 5,901,246 A | | 5/1999 | Hoffberg et al. |
| 6,102,162 A | * | 8/2000 | Teicher ........................ 186/39 |
| 6,615,166 B1 | * | 9/2003 | Guheen et al. ................ 703/27 |
| 2001/0051938 A1 | | 12/2001 | Hart et al. |
| 2002/0052913 A1 | * | 5/2002 | Yamada et al. .............. 709/202 |
| 2003/0028380 A1 | * | 2/2003 | Freeland et al. ............. 704/260 |
| 2003/0028498 A1 | * | 2/2003 | Hayes-Roth ................. 706/17 |
| 2003/0061317 A1 | * | 3/2003 | Brown et al. ................ 709/221 |
| 2003/0069790 A1 | * | 4/2003 | Kane ........................... 705/14 |
| 2003/0134259 A1 | * | 7/2003 | Adams ........................ 434/236 |

FOREIGN PATENT DOCUMENTS

| | | |
|---|---|---|
| JP | 11-259446 | 9/1999 |
| JP | 11-266239 | 9/1999 |
| JP | 2001-249949 | 9/2001 |
| JP | 2002-049934 | 2/2002 |
| JP | 2002-073233 | 3/2002 |
| KR | 10-2000-0054846 | 9/2000 |
| KR | 2002-3394 | 1/2002 |
| KR | 10-2002-0032449 | 5/2002 |
| RU | 2 144 745 | 5/1995 |
| RU | 2 154 357 | 6/1996 |

OTHER PUBLICATIONS

Karl Sims, "Evolving Virtual Creatures", Computer Graphics, SIGGRAPH '94 Proceedings, Jul. 1994.

Ales Ude et al., "Automatic Generation of Kinematic Models for the Conversion of Human Motion Capture Data into Humanoid Robot Motion", First IEEE-RAS Int. Conf. Humanoid Robots, Sep. 2000.

Michael Mateas et al., "A Bahavior Language for Story-Based Believable Agents", Working Notes of Artificial Intelligence and Interactive Entertainment, AAAI Spring Symposium Series, 2002.

Eric Horvitz et al., The Lumiére Project: Bayesian User Modeling for Inferring the Goals and Needs of Software Users, 1998.

Sara Reese Hedberg, Is AI Going Mainstream at Last? A Look Inside Microsoft Research, 1998.

* cited by examiner

PROACTIVE USER INTERFACE INCLUDING EMOTIONAL AGENT

PRIORITY

This application is a continuation-in-part of application Ser. No. 10/743,476, filed Dec. 23, 2003, which claims the benefit of U.S. Provisional Application No. 60/500,669, filed Sep. 5, 2003, and claims priority under 35 U.S.C. §119 to applications entitled "Proactive User Interface Including Emotional Agent" filed in the Korean Intellectual Property Office on Mar. 10, 2004 and assigned Serial No. 2004-16263, and filed in the Korean Intellectual Property Office on Aug. 27, 2004 and assigned Serial No. 2004-67663 the contents of each of which are hereby incorporated by reference.

BACKGROUND OF THE INVENTION

1. Field of the Invention

The present invention is of a proactive user interface, and systems and methods thereof, particularly for use with mobile information devices.

2. Description of the Related Art

The use of mobile and portable wireless devices has expanded dramatically in recent years. Many such devices having varying functions, internal resources, and capabilities now exist, and include, but are not limited to mobile telephones, personal digital assistants, medical and laboratory instrumentation, smart cards, and set-top boxes. All such devices can be referred to are mobile information devices. The devices tend to be special purpose, limited-function devices, rather than the general-purpose personal computer. Many of these devices are connected to the Internet, and are used for a variety of applications.

One example of such a mobile information device is the cellular telephone. Cellular telephones are fast becoming ubiquitous; and the use of cellular telephones is even surpassing that of traditional PSTN (public switched telephone network) telephones or "land line" telephones. Cellular telephones themselves are becoming more sophisticated, and in fact are actually computational devices with embedded operating systems.

As cellular telephones become more sophisticated, the range of functions that they offer is also potentially becoming more extensive. However, currently available functions are typically related to extensions of functions already present in regular (land line) telephones, and/or the merging of certain functions of personal digital assistants (PDAs) with those of cellular telephones. The user interface provided with cellular telephones is similarly non-sophisticated, typically featuring a keypad for scrolling through a few simple menus. Customization, although clearly desired by customers who have spent significant amounts of money on personalized ring tones and other cellular telephone accessories, is still limited to a very few functions of the cellular telephone. Furthermore, cellular telephones currently lack any automatic personalization, for example the user interface and custom/tailored functionalities that are required for better use of the mobile information device, and/or the ability to react according to the behavior of the user.

This lack of sophistication, however, is also seen with user interfaces for personal (desk top or laptop) computers and other computational devices. These computational devices can also only be customized in very simple ways. Such customization must be performed by the user, who may not understand computer functions and/or may not feel comfortable with performing such customization tasks. Currently, computational devices do not learn patterns of user behavior and adjust their own behavior accordingly, as adaptive systems for the user interface. If the user cannot manually adjust the computer, then the user must adjust his/her behavior to accommodate the computer, rather than vice versa.

Software which is capable of learning has been developed, albeit only for specialized laboratory functions. For example, "artificial intelligence" (AI) software has been developed. The term "AI" has been given a number of definitions. "AI is the study of the computations that make it possible to perceive, reason, and act." (Artificial Intelligence A Modern Approach (second edition) by Stuart Russell, Peter Norvig (Prentice Hall, Pearson Education Inc, 2003). AI software combines several different concepts, such as perception, which provides an interface to the world in which the AI software is required to reason and act. Examples include but are not limited to, natural language processing—communicating, understanding document content and context of natural language; computer vision—perceive objects from imagery source; and sensor systems—perception of objects and features of perceived objects analyzing sensory data, etc.

Another important concept is that of the knowledge base. Knowledge representation is responsible for representing extracting and storing knowledge. This discipline also provides techniques to generalize knowledge, feature extraction and enumeration, object state construction and definitions. The implementation itself may be performed by commonly using known data structures, such as graphs, vectors, tables, etc.

Yet another important concept is that of reasoning. Automated reasoning combines the algorithms that use the knowledge representation and perception to draw new conclusions, infer questions and answers, and achieve the agent goals. The following conceptual frameworks are examples of AI reasoning: rule bases—system rules are evaluated against the knowledge base and perceived state for reasoning; search systems—the use of well known data structures for searching for an intelligent conclusion according to the perceived state, the available knowledge and goal (examples include decision trees, state graphs, minimax decision etc); classifiers—the target of the classifier reasoning system is to classify a perceived state represented as an experiment that has no classification tag. According to a pre-classified knowledge base the classifier will infer the classification of the new experiment (examples include vector distance heuristics, Support Vector Machine, Classifier Neural Network etc).

Another important concept is for learning. The target of learning is improving the potential performance of the AI reasoning system by generalization over experiences. The input of a learning algorithm will be the experiment and the output would be modifications of the knowledge base according to the results (examples include Reinforcement learning, Batch learning, Support Vector Machine etc).

Work has also been done for genetic algorithms and evolution algorithms for software. One example of such software is described in "Evolving Virtual Creatures", by Karl Sims (*Computer Graphics*, SIGGRAPH '94 Proceedings, July 1994, pp. 15-22). This reference described software "creatures" which could move through a three-dimensional virtual world, which is a simulated version of the actual physical world. The creatures could learn and evolve by using genetic algorithms, thereby changing their behaviors without directed external input. These genetic algorithms therefore delineated a hyperspace of potential behaviors having different "fitness" or rewards in the virtual world. The algorithms themselves were implemented by using directed graphs, which describe both the genotypes (components) of the creatures, and their behavior.

At the start of the simulation, many different creatures with different genotypes are simulated. The creatures are allowed to alter their behavior in response to different stimuli in the virtual world. At each "generation", only certain creatures are allowed to survive, either according to a relative or absolute cut-off score, with the score being determined according to the fitness of the behavior of the creatures. Mutations are permitted to occur, which may increase the fitness (and hence survivability) of the mutated creatures, or vice versa. Mutations are also performed through the directed graph, for example by randomly changing a value associated with a node, and/or adding or deleting nodes. Similarly, "mating" between creatures may result in changes to the directed graph.

The results described in the reference showed that in fact virtual creatures could change and evolve. However, the creatures could only operate within their virtual world, and had no point of reference or contact with the actual physical world, and/or with human computer operators.

SUMMARY OF THE PRESENT INVENTION

The background art does not teach or suggest a system or method for enabling intelligent software at least for mobile information devices to express an emotion specifically for interacting with human users. The background art also does not teach or suggest a proactive user interface for a computational device, in which the proactive user interface learns the behavior of the user and is then able to actively suggest options to the user and express an emotion according to a reaction of the user to the suggestion. The background art also does not teach or suggest an intelligent agent for a mobile information device, which can perform interaction with a human user through an avatar, said interaction including emotional expression.

The present invention overcomes these deficiencies of the background art by providing a proactive user interface, which could be installed in (or otherwise control and/or be associated with) any type of computational device. The proactive user interface would actively make suggestions to the user, and/or otherwise engage in non-deterministic or unexpected behavior, based upon prior experience (interaction) with a particular user and/or various preprogrammed patterns from which the computational device could select, depending upon user behavior. These suggestions could be made by altering the appearance of at least a portion of the display, for example by changing a menu or a portion thereof; providing different menus for display; and/or altering touch screen functionality. The suggestions could also be made audibly. Other types of suggestions or delivery mechanisms are possible. The present invention features the expression of an emotion of the agent according to a reaction of the user to such a suggestion.

By "suggestion" it should be noted that the system may actually execute the action automatically and express a corresponding emotion of the agent, given certain user preferences and also depending upon whether the system state allows the specific execution of the action. The present invention is characterized in that the emotional expression of the agent depends upon whether or not the user makes a selection in response to a "suggestion" of the agent or upon the user's rewards to the suggestion of the agent.

Generally, it is important to emphasize that the proactive user interface at least appears to be intelligent and interactive, and is capable of at least somewhat "free" (e.g. non-scripted or partially scripted) communication with the user. An intelligent appearance is important in the sense that the expectations of the user are fulfilled for interactions with an "intelligent" agent/device. These expectations may be shaped by such factors as the ability to communicate, the optional appearance of the interface, the use of anthropomorphic attribute(s) and so forth, which are used to increase the sense of intelligence in the interactions between the user and the proactive user interface. In terms of communication received from the user, the proactive user interface is able to sense how the user wants to interact with the mobile information device. Communication may be in only one direction; for example, the interface may present messages or information to the user, but not receive information from the user, or alternatively the opposite may be implemented. Communication is bi-directional for preferred interactions with the user.

For communication to the user, the proactive interface is capable of displaying or demonstrating simulated emotions for interactions with the user, as part of communication with the user. As described in greater detail below, these emotions are simulated for presentation by an intelligent agent, more preferably represented by an avatar or creature. The emotions are created through an emotional system, which may optionally be at least partially controlled according to at least one user preference. The emotional system is used in order for the reactions and communications of the intelligent agent to be believable in terms of the perception of the user; for example, if the intelligent agent is presented as a dog-like creature, the emotional system enables the emotions to be consistent with the expectations of the user with regard to "dog-like" behavior.

Similarly, the intelligent agent at least appears to be intelligent to the user. The intelligence may be provided through a completely deterministic mechanism; however, the basis for at least the appearance of intelligence includes at least one or more random or semi-random elements. Again, such elements are present in order to be consistent with the expectations of the user concerning intelligence with regard to the representation of the intelligent agent.

Adaptiveness is present, in order for the intelligent agent to be able to alter behavior at least somewhat for satisfying the request or other communication of the user. Even if the proactive user interface does not include an intelligent agent for communicating with the user, adaptiveness enables the interface to be proactive. Observation of the interaction of the user with the mobile information device enables such adaptiveness to be performed, although the reaction of the proactive user interface to such observation may be guided by a knowledge base and/or a rule base.

As a specific, non-limiting but preferred example of such adaptiveness, particularly for a mobile information device which includes a plurality of menus, such adaptiveness may include the ability to alter at least one aspect of the menu. For example, one or more shortcuts may be provided, enabling the user to directly reach a menu choice while bypassing at least one (and more preferably all) of the previous menus or sub-menus which are higher in the menu hierarchy than the final choice. One or more menus may be rearranged according to adaptiveness of the proactive user interface, for example according to frequency of use. Such a rearrangement may include moving a part of a menu, such as a menu choice and/or a sub-menu, to a new location that is higher in the menu hierarchy than the current location. Sub-menus which are higher in a menu hierarchy are reached more quickly, through the selection of fewer menu choices, than those which are located in a lower (further down) location in the hierarchy.

Adaptiveness and/or emotions are assisted through the use of rewards for learning by the proactive user interface. Suggestions or actions of which the user approves preferably provide a reward, or a positive incentive, to the proactive interface to continue with such suggestions or actions; disapproval by the user causes a disincentive to the proactive user interface to continue such behavior(s). Providing positive or negative incentives/disincentives to the proactive user interface enables the behavior of the interface to be more nuanced, rather than a more "black or white" approach, in which a behavior would either be permitted or forbidden. Such nuances are also preferred to enable opposing or contradictory behaviors to be handled, when such behaviors are collectively approved/disapproved by the user to at least some extent.

According to an embodiment of the present invention, a model of the user is constructed through the interaction of the proactive user interface with the user. Such a model would integrate AI knowledge bases determined from the behavior of the user and/or preprogrammed. Furthermore, the model would also enable the proactive user interface to gauge the reaction of the user to particular suggestions made by the user interface, thereby adapting to the implicit preferences of the user.

Non-limiting examples of such computational devices include automatic teller machines (ATMs) (this also has security implications, as certain patterns of user behavior could set off an alarm, for example), regular computers of any type (such as desktop, laptop, thin clients, wearable computers and so forth), mobile information devices such as cellular telephones, pager devices, other wireless communication devices, regular telephones having an operating system, PDAs and wireless PDAs, and consumer appliances having an operating system. Hereinafter, the term "computational device" includes any electronic device having an operating system and being capable of performing computations. The operating system may be an embedded system and/or another type of software and/or hardware run time environment. Hereinafter, the term "mobile information device" includes but is not limited to, any type of wireless communication device, including but not limited to, cellular telephones, wireless pagers, wireless PDAs and the like.

The present invention is implemented in order to provide an enhanced user experience and interaction with the computational device, as well as to change the current generic, non-flexible user interface of such devices into a flexible, truly user friendly interface. More preferably, the present invention is implemented to provide an enhanced emotional experience of the user with the computational device, for example according to the optional but preferred embodiment of constructing the user interface in the form of an avatar which would interact with the user. The present invention is therefore capable of providing a "living device" experience, particularly for mobile information devices such as cellular telephones, for example. According to this embodiment, the user may even form an emotional attachment to the "living device".

According to another embodiment of the present invention, there is provided a mobile information device which includes an adaptive system. Like the user interface above, it also relies upon prior experience with a user and/or preprogrammed patterns. However, the adaptive system is more restricted to operating within the functions and environment of a mobile information device.

Either or both of the mobile information device adaptive system and proactive user interfaces may be implemented with genetic algorithms, artificial intelligence (AI) algorithms, machine learning (ML) algorithms, learned behavior, and software/computational devices which are capable of evolution. Either or both may also provide an advanced level of voice commands, touch screen commands, and keyboard 'short-cuts'.

According to another preferred embodiment of the present invention, there is provided one or more intelligent agents for use with a mobile information device over a mobile information device network, including an avatar (or "creature"; hereinafter these terms are used interchangeably) through which the agent may communicate with the human user. The avatar provides a user interface for interacting with the user. The intelligent agent can also include an agent for controlling at least one interaction of the mobile information device over the network. This embodiment may include a plurality of such intelligent agents being connected over the mobile information device network, thereby forming a network of such agents. Various applications may also be provided through this embodiment, including but not limited to teaching in general and/or for learning how to use the mobile information device in particular, teaching languages, communication applications, community applications, games, entertainment, shopping (getting coupons etc), locating a shop or another place, filtering advertisements and other non-solicited messages, role-playing or other interactive games over the cell phone network, "chat" and meeting functions, the ability to buy "presents" for the intelligent agents and otherwise accessorize the character, and so forth. In theory, the agents themselves could be given "pets" as accessories.

Therefore, a number of different interactions are possible according to the various embodiments of the present invention. These interactions include any one or more of an interaction between the user of the device and an avatar or other character or personification of the device; an interaction between the user of the device and the device, for operating the device, through the avatar or other character or personification; interactions between two users through their respective devices, by communicating through the avatar, or other character or personification of the device; and interactions between two devices through their respective intelligent agents, without any communication between users or even between the agent and the user. The interaction or interactions that are possible are determined according to the embodiment of the present invention, as described in greater detail below.

The present invention benefits from the relatively restricted environment of a computational device and/or a mobile information device, such as a cellular telephone for example, because the parameters of such an environment are known in advance. Even if such devices are communicating through a network, such as a cellular telephone network for example, the parameters of the environment can still be predetermined. Currently, computational devices only provide a generic interface, with little or no customization permitted by even manual, direct intervention by the user.

It should be noted that the term "software" may also optionally include firmware or instructions operated by hardware.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
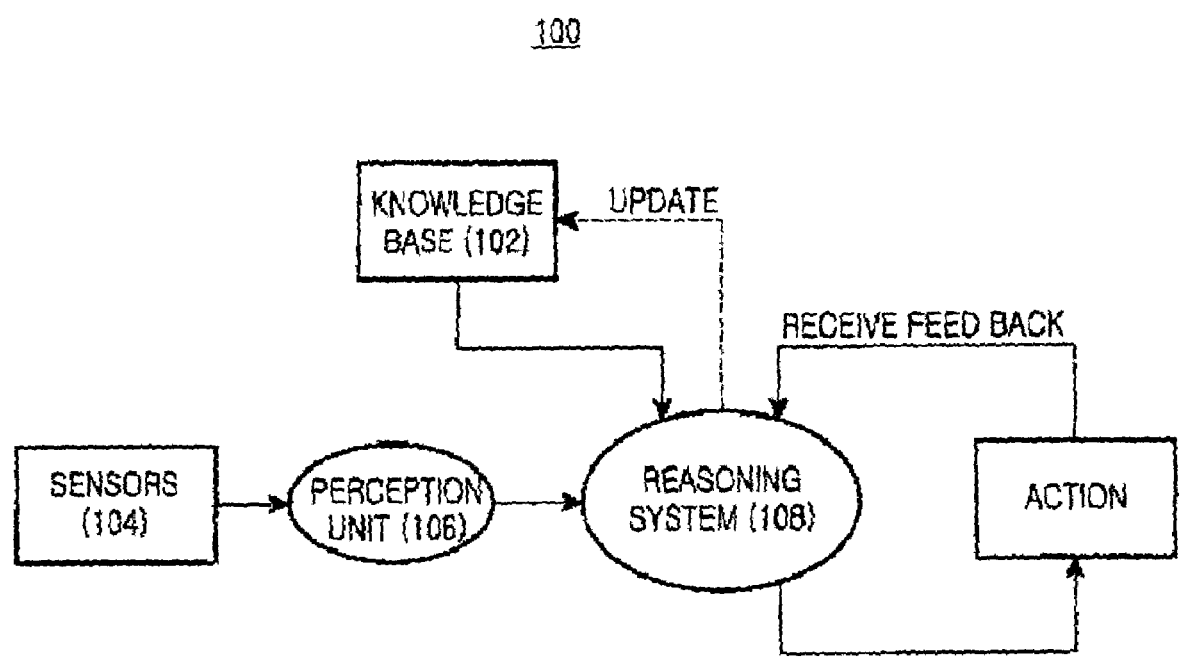
FIG. 1 is a block diagram of an exemplary learning module according to the present invention.

Preferred embodiments of the present invention will be described herein below with reference to the accompanying drawings. In the following description, well-known functions or constructions are not described in detail since they would obscure the invention in unnecessary detail.

The present invention is of a proactive user interface, which could be installed in (or otherwise control and/or be associated with) any type of computational device. The proactive user interface actively makes suggestions to the user, based upon prior experience with a particular user and/or various preprogrammed patterns from which the computational device could select, depending upon user behavior. These suggestions could optionally be made by altering the appearance of at least a portion of the display, for example by changing a menu or a portion thereof; providing different menus for display; and/or altering touch screen functionality. The suggestions could also be made audibly. The present invention features the expression of an emotion of the agent according to a reaction of the user to such a suggestion.

The proactive user interface is preferably implemented for a computational device, as previously described, which includes an operating system. The interface can include a user interface for communicating between the user and the operating system. The interface can also include a learning module for detecting at least one pattern of interaction of the user with the user interface and for proactively altering at least one function of the user interface according to the detected pattern. Therefore, the proactive user interface can anticipate the requests of the user and thereby assist the user in selecting a desired function of the computational device.

According to another embodiment of the present invention, there is provided a mobile information device which includes an adaptive system. Like the user interface above, it also relies upon prior experience with a user and/or preprogrammed patterns. However, the adaptive system can be more restricted to operating within the functions and environment of a mobile information device, such as a cellular telephone for example, which currently may also include certain basic functions from a PDA.

The adaptive system preferably operates with a mobile information device featuring an operating system. The operating system can comprise an embedded system. The mobile information device can comprise a cellular telephone.

The adaptive system be operated by the mobile information device itself. Alternatively, if the mobile information device is connected to a network, the adaptive system may be operated at least partially according to commands sent from the network to the mobile information device. For this implementation, data associated with at least one operation of the adaptive system is stored at a location other than the mobile information device, in which the location is accessible through the network.

According to another optional but preferred embodiment of the present invention, there is provided one or more intelligent agents for use with a mobile information device over a mobile information device network, preferably including an avatar through which the agent may communicate with the human user. The avatar can therefore provide a user interface for interacting with the user. The intelligent agent can also includes an agent for controlling at least one interaction of the mobile information device over the network. This embodiment may include a plurality of such avatars being connected over the mobile information device network.

According to preferred embodiments of the present invention, at least one characteristic of an appearance of the avatar can be altered, for example according to a user command. A plurality of characteristics of an appearance of avatar can be altered according to a predefined avatar skin. The skin can be predefined by the user. By "skin" it is meant that a plurality of the characteristics is altered together as a set, in which the set forms the skin. If this embodiment is combined with the previous embodiment of having at least a portion of the data related to the avatar being stored at a network-accessible location, then the user could move the same avatar onto different phones, and/or customize the appearance of the avatar for different reasons, for example for special occasions such as a party or other celebration. Of course, these are only intended as examples and are not meant to be limiting in any way.

In terms of technical implementation, the present invention is preferably capable of operating on a limited system (in terms of memory, data processing capacity, screen display size and resolution, and so forth) in a device which is also very personal to the user. For example, the device is a mobile information device, such as a cellular telephone, which by necessity is adapted for portability and ease of use, and therefore may have one or more, or all, of the above limitations. The implementation aspects of the present invention are preferably geared to this combination of characteristics. Therefore, in order to overcome the limitations of the device itself while still maintaining the desirable personalization and "personal feel" for the user, various solutions are proposed below. It should be noted that these solutions are examples only, and are not meant to be limiting in any way.

Example 1

Proactive Interface—General

The proactive user interface of the present invention is preferably able to control and/or be associated with any type of computational device, in order to actively make suggestions to the user, based upon prior experience with a particular user and/or various preprogrammed patterns from which the computational device could select, depending upon user behavior. These suggestions could be made by altering the appearance of at least a portion of the display, for example by changing a menu or a portion thereof; providing different menus for display; and/or altering touch screen functionality. The suggestions could also be made audibly.

The proactive user interface is preferably implemented for a computational device, as previously described, which includes an operating system. The interface can include a user interface for communicating between the user and the operating system. The interface is preferably able to detect at least one pattern of interaction of the user with the user interface, for example through operation of a learning module and would therefore be able to proactively alter at least one function of the user interface according to the detected pattern. The proactive user interface can anticipate the requests of the user and thereby assist the user in selecting a desired function of the computational device.

This type of proactive behavior, particularly with regard to learning the behavior and desires of the user, requires some type of learning capability on the part of the proactive interface. Such learning capabilities may be provided through algorithms and methodologies which are known in the art, relating to learning (by the software) and interactions of a software object with the environment. Software can be said to be learning when it can improve its actions over a period of time. Artificial Intelligence needs to demonstrate intelligent action selection (reasoning), such that the software has the ability to explore its environment (its "world") and to discover action possibilities. The software also have the ability to represent the world's state and its own internal state. The software would then be able to select an intelligent action (using the knowledge above) and to act.

Learning, for example by the learning module of the interface, can be reinforced by rewards, in which the learning module is rewarded for taking particular actions according to the state of the environment. This type of learning actually involves training the learning module to behave in a certain manner. If more than one behavior is allowed, then the learning process is non-deterministic and can create different behaviors. With regard to the proactive user interface, for example, the reward includes causing the learning module to detect when an offered choice leads to a user selection, as opposed to when an offered choice causes the user to seek a different set of one or more selections, for example by selecting a different menu than the one offered by the proactive user interface. Clearly, the proactive user interface should seek to maximize the percentage of offerings which lead to a direct user selection from that offering, as this shows that the interface has correctly understood the user behavior.

FIG. 1 is a block diagram of an exemplary learning module according to the present invention for reactive learning. As shown, a learning module 100 includes a Knowledge Base 102, which acts as the memory of learning module 100, by holding information gathered by the learning module 100 as a result of interactions with the environment. Knowledge Base 102 may be stored in non-volatile memory (not shown). Knowledge Base 102 stores information that assists the learning module 100 to select the appropriate action. This information can include values such as numerical weights for an inner neural net, or a table with action reward values, or any other type of information.

In order for learning module 100 to be able to receive information related to the environment, the learning module 100 features a plurality of sensors 104. The sensors 104 allow the learning module 100 to perceive its environment state. The sensors 104 are connected to the environment and output sensed values. The values can come from the program itself (for example, position on screen, energy level, etc.), or from real device values (for example, battery value and operating state, such as a flipper state for cellular telephones in which the device can be activated or an incoming call answered by opening a "flipper").

Sensors 104 clearly provide valuable information; however, this information needs to be processed before learning the module 100 can comprehend it. Therefore, learning the module 100 also includes a perception unit 106, for processing the current output of the sensors 104 into a uniform representation of the world, called a "state". The state is then the input to a reasoning system 108, which may be described as the "brain" of learning module 100. This design supports the extension of the world state and the sensor mechanism, as well as supporting easy porting of the system to several host platforms (different computational devices and environments), such that the world state can be changed according to the device.

The reasoning system 108 processes the current state with the Knowledge Base 102, thereby producing a decision as to which action to perform. The reasoning system 108 receives the current state of the world, outputs the action to be performed, and receives feedback on the action selected. Based on the feedback, the reasoning system 108 updates the Knowledge Base 102. This is an iterative process in which learning module 100 learns to associate actions to states.

According to another embodiment of the present invention, the computational device may feature one or more biological sensors, for sensing various types of biological information about the user, such as emotional state, physical state, movement, etc. This information may then be fed to the sensors 104 for assisting the perception unit 106 to determine the state of the user, and hence in a determination of the proper state for the device. Such biological sensors may include but are not limited to sensors for body temperature, heart rate, oxygen saturation or any other type of sensor which measures biological parameters of the user.

Figure 2:
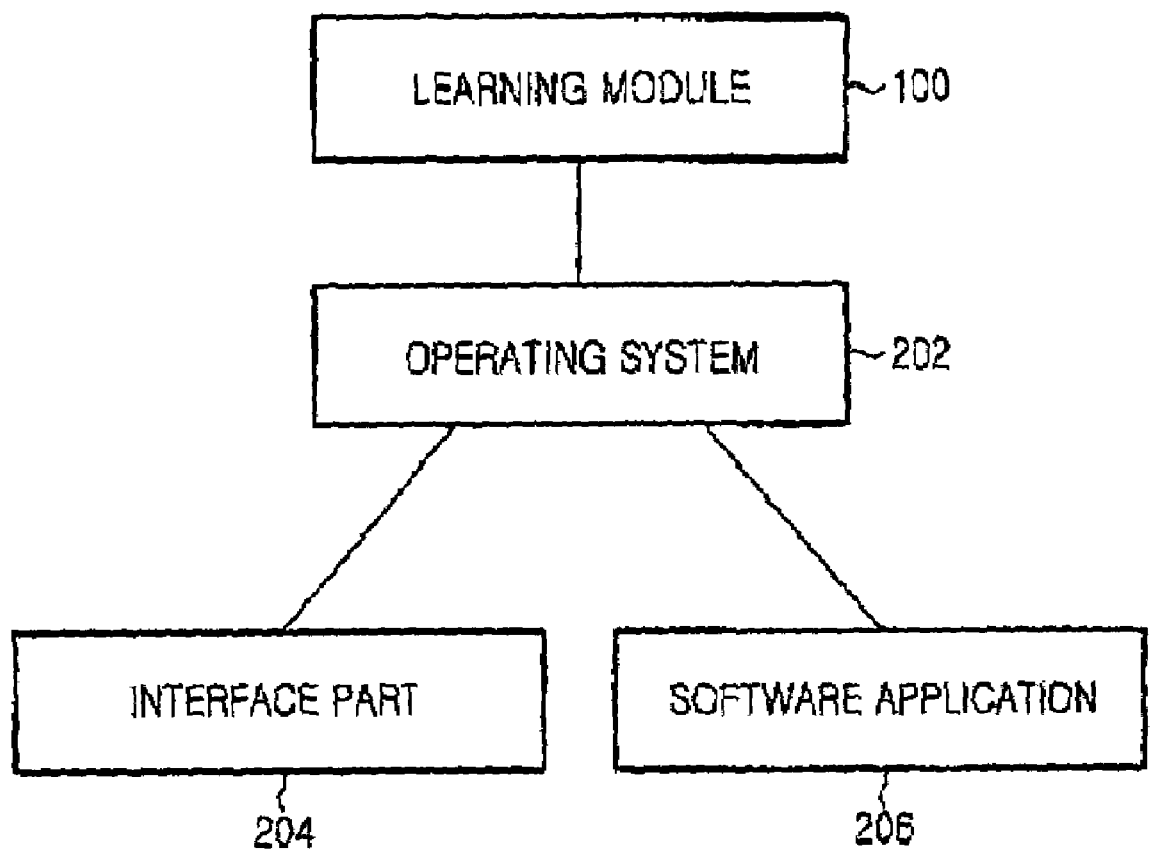
FIG. 2 is a block diagram of an exemplary system according to the present invention for using the proactive user interface.

FIG. 2 shows an exemplary embodiment of a system 200 according to the present invention for providing the proactive user interface, again featuring the learning module 100. The learning module 100 is shown communicating with an operating system 202 of the computational device (not shown) with the which learning module 100 is associated and/or controls and/or by which the learning module 100 is operated. The operating system 202 controls the operation of an interface part 204 and also at least one other software application 206 (although of course many such software applications may optionally be present).

The user communicates through interface part 204, for example by selecting a choice from a menu. The operating system 202 enables this communication to be received and translated into data. The learning module 100 then preferably receives such data, and can send a command back to the operating system 202, for example to change some aspect of the interface part 204 (for example by offering a different menu), and/or to operate the software application 206. The user then responds through the interface part 204; from this response, the learning module 100 learns whether or not the action (command that was sent by learning module 100) was appropriate.

Figure 3:
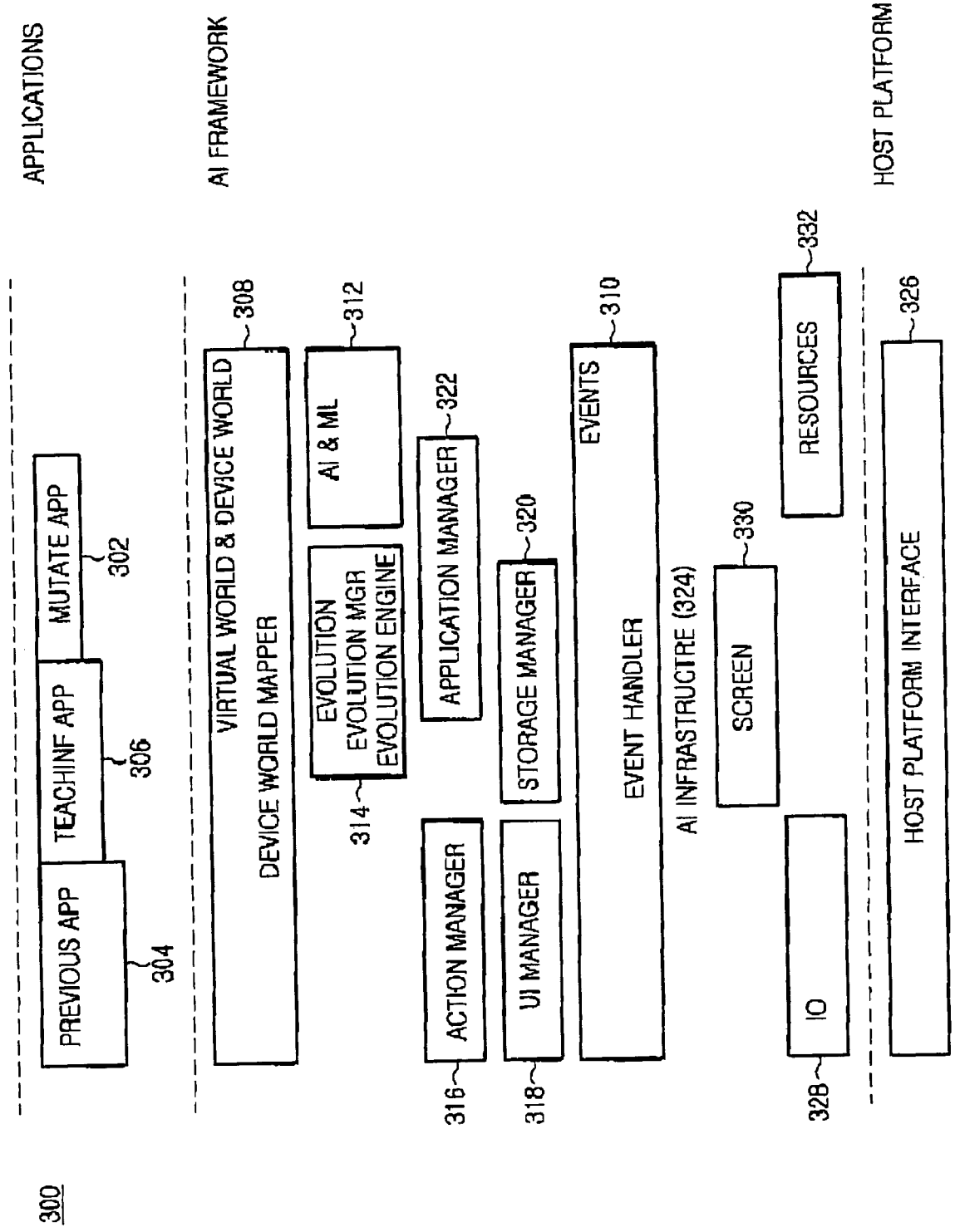
FIG. 3 shows an exemplary implementation of a proactive user interface system according to the present invention.

FIG. 3 is a block diagram showing an exemplary implementation of a proactive user interface system 300 according to the present invention. As shown, system 300 features a three level architecture, with an application layer being supported by an AI (artificial intelligence) framework, which in turn communicates with the host platform computational device (shown as "host platform").

The application layer features a plurality of different applications, of which a few non-limiting examples are shown, such as a MutateApp 302, a PreviousApp 304 and a TeachingApp 306.

The MutateApp 302 is invoked in order to control and/or initiate mutations in the system 300. As noted above, the learning module can optionally change its behavior through directed or semi-directed evolution, for example through genetic algorithms. The MutateApp 302 controls and/or initiates such mutations through evolution. The embodiment of evolution is described in greater detail below.

The PreviousApp 304 enables a prior state of the system 300, or a portion thereof (such as the state of the learning module) to be invoked in place of the current state. More specifically, the PreviousApp 304 enables the user to return to the previous evolutionary step if the present invention is being implemented with an evolutionary algorithm. More generally, the system 300 is preferably stateful and therefore can return to a previous state, as a history of such states is preferably maintained.

The TeachingApp 306 is only one non-limiting example of a generic application which may be implemented over the AI framework layer.

The AI framework layer itself contains one or more components which enable the user interface to behave in a proactive manner. The framework can include a DeviceWorldMapper 308, for determining the state of the computational device and also that of the virtual world, as well as the relationship between the two states. The DeviceWorldMapper 308 receives input, for example from various events from an EventHandler 310, in order to determine the state of the virtual world and that of the device.

The DeviceWorldMapper 308 also communicate with an AI/ML (machine learning) module 312 for analyzing input data. The AI/ML module 312 can also determine the behavior of the proactive user interface in response to various stimuli, and also enables the proactive user interface to learn, for example from the response of the user to different types of user interface actions.

The Evolution module 314 is a non-limiting example of the application for managing the evolutions of the intelligent agent. The evolution module 314 supports and also preferably manages such evolution, for example through the operation of MutateApp 302.

Between these different AI-type applications and the EventHandler 310, one or more different low level managers preferably support the receipt and handling of different events, and also the performance of different actions by the system 300. These managers may include but are not limited to, an ActionManager 316, a UIManager 318, a StorageManager 320 and an ApplicationManager 322.

The ActionManager 316 is described in greater detail below, but briefly enables the system 300 to determine which action should be taken, for example through the operation of the AI/ML module 312.

The UIManager 318 manages the appearance and functions of the user interface, for example by directing changes to that interface as previously described.

The StorageManager 320 manages the storage and handling of data, for example with regard to the knowledge base of system the 300 (not shown).

The ApplicationManager 322 handles communications with the previously described applications in the application layer.

All of these different managers receive events from the EventHandler 310.

Within the AI framework layer, an AI infrastructure 324 supports communication with the host platform. The host platform itself features a host platform interface 326, which may be provided through the operating system of the host platform for example.

The AI infrastructure 324 can include an I/O module 328, for receiving inputs from the host platform interface 326 and also for sending commands to the host platform interface 326. A screen module 330 handles the display of the user interface on the screen of the host platform computational device. A resources module 332 enables the system 300 to access various host platform resources, such as data storage and so forth.

Of course, the above Figures represent only one optional configuration for the learning module. For example, the learning module may also be represented as a set of individual agents, in which each agent has a simple goal. The learning module chooses an agent to perform an action based on the current state. The appropriate mapping between the current state and agents can also be learned by the learning module with reinforcement learning.

Example 2

Adaptive System for Mobile Information Device

This example relates to the illustrative implementation of an adaptive system of the present invention with a mobile information device, although it should be understood that this implementation is preferred but optional, and is not intended to be limiting in any way.

The adaptive system may optionally include any of the functionality described above in Example 1, and may also be implemented as previously described. This Example focuses more on the actual architecture of the adaptive system with regard to the mobile information device operation. Also, this Example describes an optional but preferred implementation of the creature or avatar according to the present invention.

The next sections describe optional but preferred embodiments of specific technical implementations of various aspects of the adaptive system according to the present invention. For the purpose of description only and without any intention of being limiting, these embodiments are based upon the optional but preferred embodiment of an adaptive system interacting with the user through an intelligent agent, optionally visually represented as an avatar or "creature".

Section 1: Event Driven System

This Section describes a preferred embodiment of an event driven system according to the present invention, including but not limited to an application manager, and interactions between the device itself and the system of the present invention as it is operated by the device.

Figure 4:
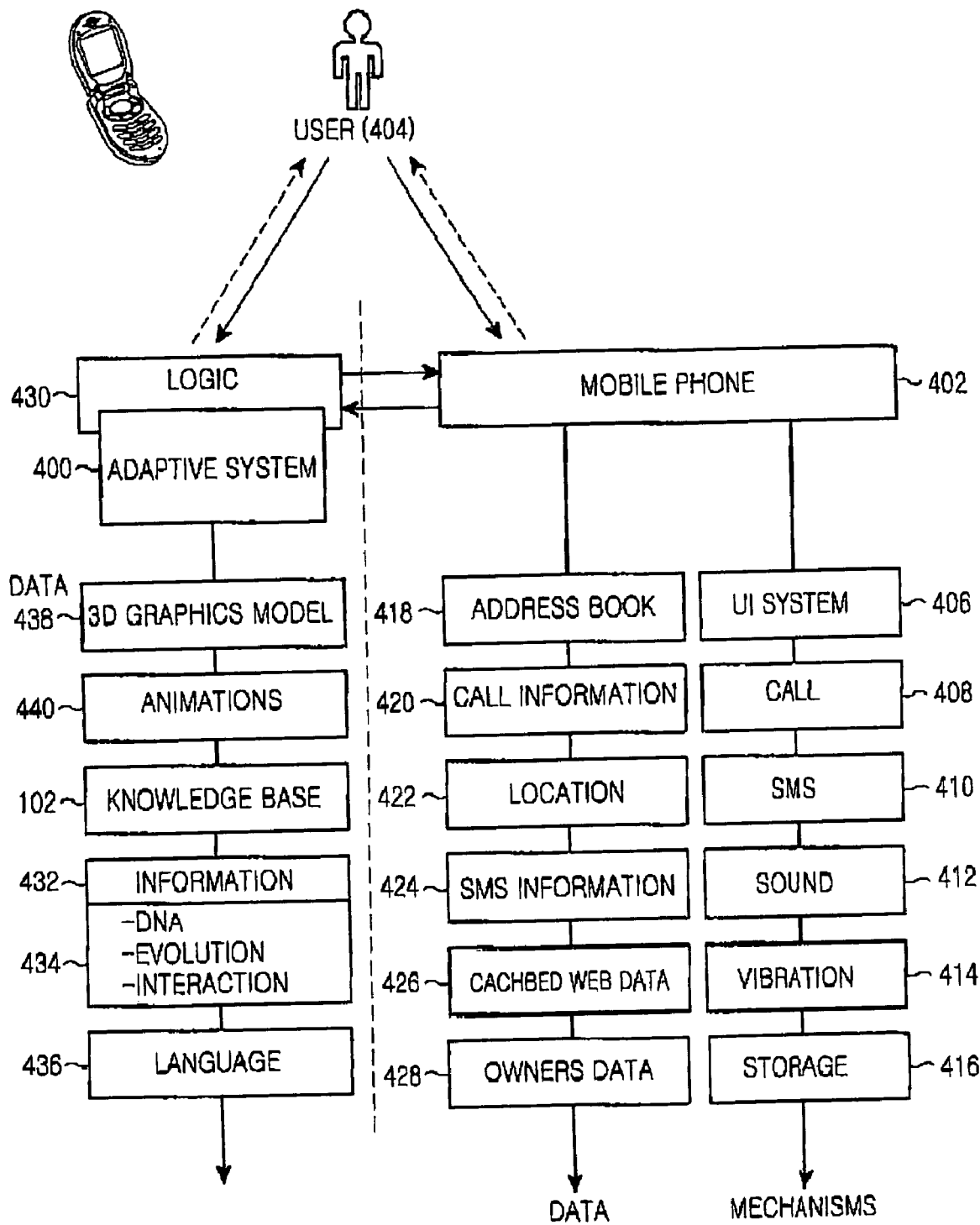
FIG. 4 is a block diagram of an exemplary implementation of the adaptive system according to the present invention.

FIG. 4 is a block diagram of an exemplary adaptive system 400 according to the present invention, and interactions of the system 400 with a mobile information device 402. Also as shown, both the system 400 and the mobile information device 402 interact with a user 404.

The mobile information device 402 has a number of standard functions, which are shown divided into two categories for the purpose of explanation only: data and mechanisms. Mechanisms may include but are not limited to such functions as a UI (user interface) system 406 (screen, keypad or touch-screen input, etc); incoming and outgoing call function 408; messaging function 410 for example for SMS; sound 412 and/or vibration 414 for alerting user 404 of an incoming call or message, and/or alarm etc; and storage 416.

Data may include such information as an address (telephone) book 418; incoming or outgoing call information 420; the location of the mobile information device 402, shown as location 422; message information 424; cached Internet data 426; and data related to the user 404, shown as owner data 428.

It should be noted that mobile information device 402 may include any one or more of the above data/mechanisms, but does not necessarily need to include all of them, and/or may include additional data/mechanisms that are not shown. These are simply intended as non-limiting examples with regard to the mobile information device 402, particularly for cellular telephones.

The adaptive system 400 according to the present invention preferably interacts with the data/mechanisms of the mobile information device 402 in order to be able to provide an adaptive (and also preferably proactive) user interface, thereby increasing the ease and efficiency with which the user 404 interacts with the mobile information device 402.

The adaptive system 400 features logic 430, which functions in a similar manner as the previously described learning module, and which also operates according to the previously described AI and machine learning algorithms.

The logic 430 is able to communicate with the knowledge base 102 as described with regard to FIG. 1 (components featuring the same reference numbers have either identical or similar functionality, unless otherwise stated). The information storage 432 includes data about the actions of the mobile information device 402, user information and so forth, and preferably supplements the data in the knowledge base 102.

Preferably, the adaptive system 400 is capable of evolution, through an evolution logic 434, which may optionally combine the previously described functionality of the evolution module 314 and the MutateApp 302 of FIG. 3.

Optionally, adaptive system 400 is capable of communicating directly with user 404 through text and/or audible language, as supported by a language module 436.

Optionally, for the adaptive system 400, the user 404 may be presented with an avatar (not shown) for the user interface. If present, such an avatar may be created through a 3D graphics model 438 and an animation module 440. The avatar may be personalized for the user 404, thereby providing an enhanced emotional experience for the user 404 when interacting with the mobile information device 402.

Figure 5A:
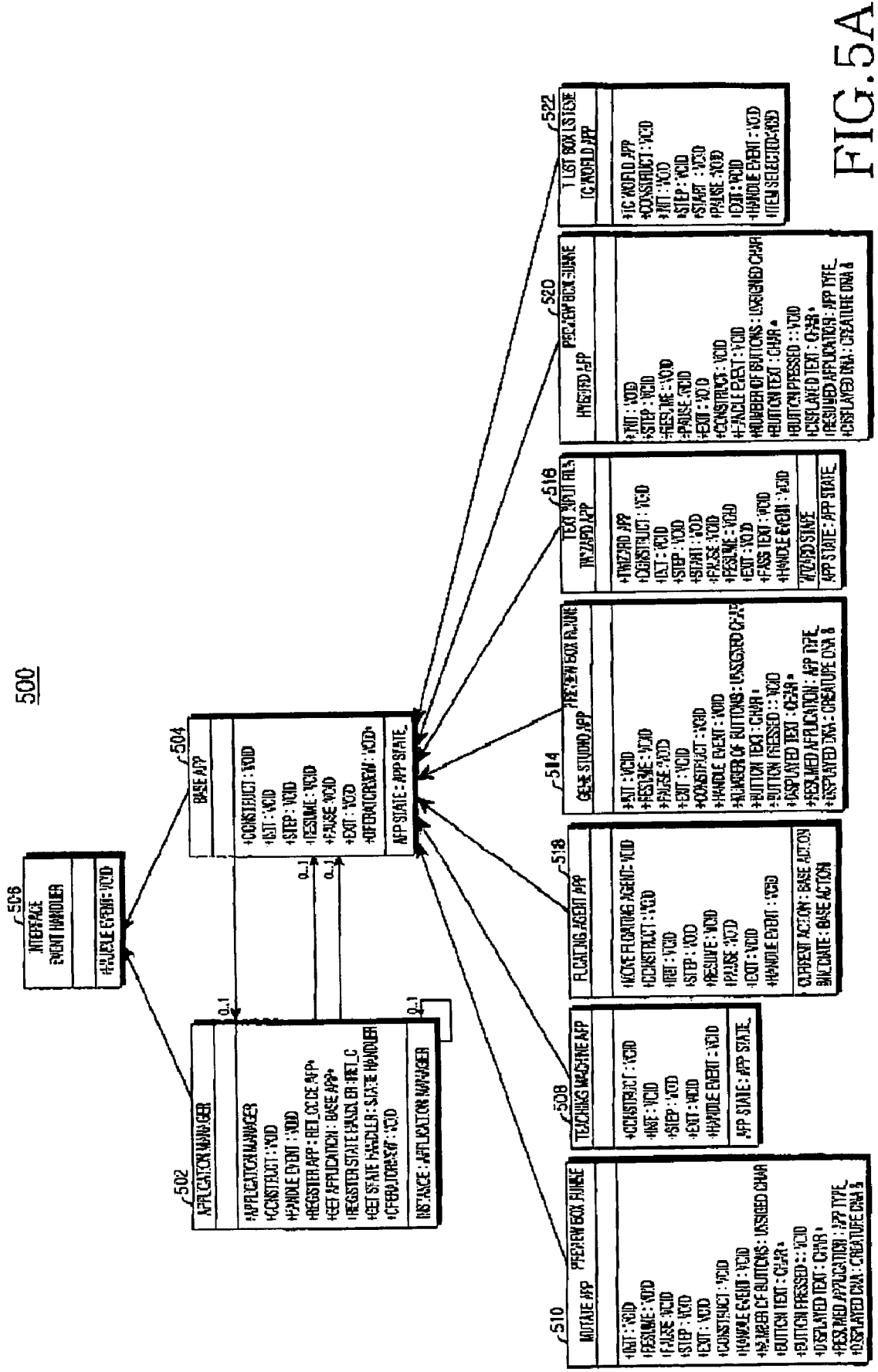
FIGS. 5A and 5B are a block diagram and a sequence diagram, respectively, of an exemplary application management system according to the present invention.

FIG. 5A shows a block diagram of an exemplary application management system 500, which is a core infrastructure for supporting the adaptive system of the present invention. The system 500 may also be used for supporting such embodiments as a teaching application, as previously described and also as described in greater detail below. The system 500 features an application manager 502 for managing the different types of applications which are part of the adaptive system according to the present invention. The application manager 502 communicates with an application interface called a BaseApp 504, which is implemented by all applications in the system 500. Both application manager 502 and the BaseApp 504 communicate events through an EventHandler 506.

The application manager 502 is responsible for managing and providing runtime for the execution of the system applications (applications which are part of the system 500). The life cycle of each such application is defined in BaseApp 504, which allows the application manager 502 to start, pause, resume and exit (stop) each such application. The application manager 502 manages the runtime execution through the step method of the interface of BaseApp 504. It should be noted that the step method is used for execution, since the system 500 is stateful, such that each step preferably corresponds (approximately) to one or more states. However, execution could also be based upon threads and/or any type of execution method.

The application manager 502 receives a timer event from the mobile information device. The mobile information device features an operating system, such that the timer event is preferably received from the operating system layer. When a timer is invoked, application manager 502 invokes the step of the current application being executed. The application manager 502 switches from one application to another application when the user activates a different application, for example when using the menu system.

Some non-limiting examples of the system applications are shown, including but not limited to, a TeachingMachineApp 508, a MutateApp 510, a GeneStudioApp 514, a TWizardApp 516, a FloatingAgentApp 518, a TCWorldApp 522 and a HybridApp 520. These applications are also described in greater detail below with regard to Example 3.

The TCWorldApp 522 is an application which runs the intelligent agent, controlling both the intelligent aspects of the agent and also the graphical display of the creature or avatar.

The TWizardApp 516 is another type of application which provides information to the user. It is described with regard to the Start Wizard application in Example 3 below. Briefly, this application contains the user preferences and configuration of the AI framework, such as the character of the intelligent agent, particularly with regard to the emotional system, and also with regard to setting goal priorities.

The FloatingAgentApp 518 controls the appearance of the user interface, particularly with regard to the appearance of an avatar (if present). The FloatingAgentApp 518 enables the visual display aspects of the user interface to be displayed independently of the display of the avatar, which may therefore appear to "float" over the user interface for example. The FloatingAgentApp 518 is the default application being operated when no other application is running.

Figure 5B:
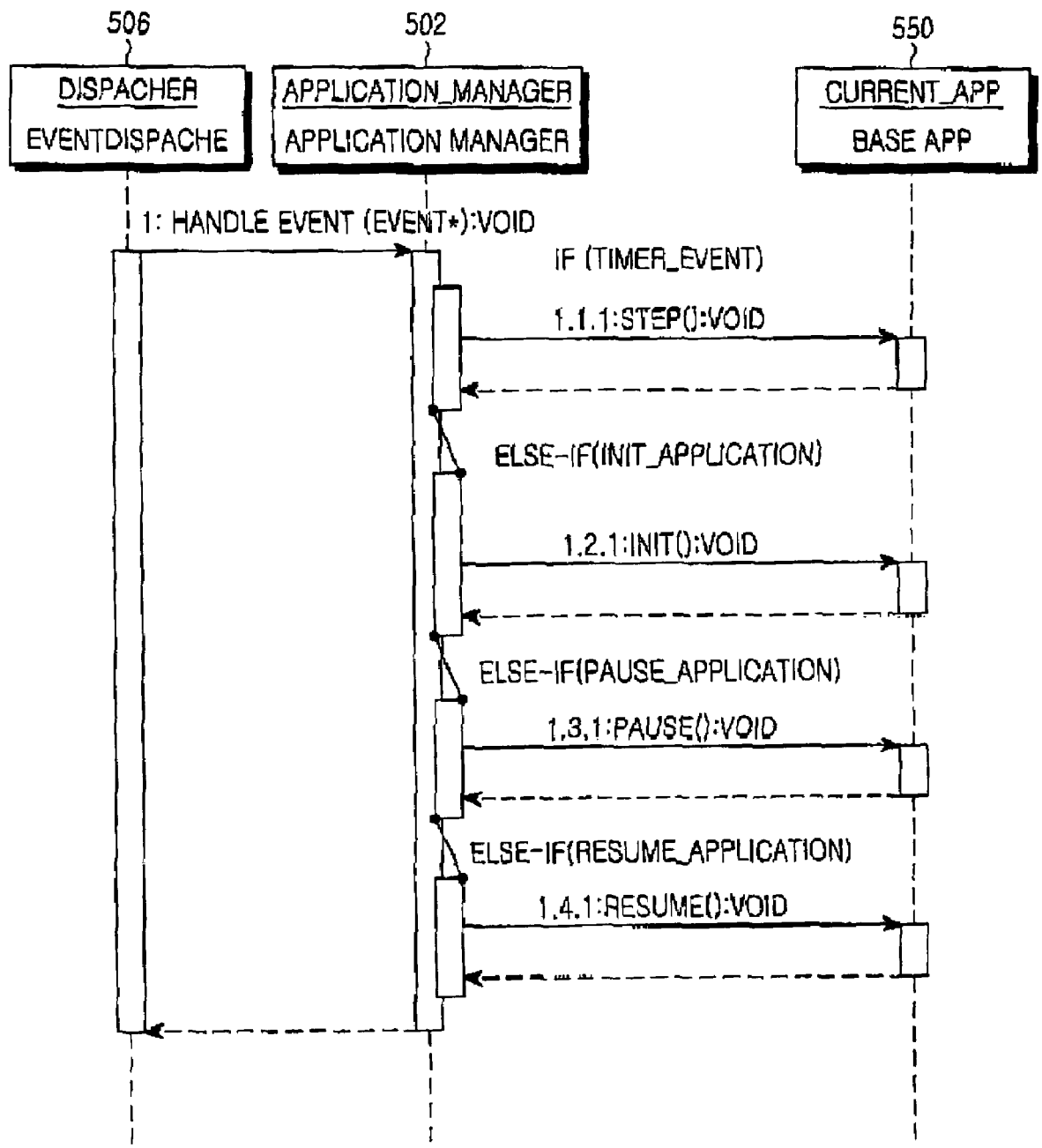

FIG. 5B shows an exemplary sequence diagram for the operations of the application manager according to the present invention. As shown, an EventHandler 506 dispatches a notification of an event to the application manager 502, as shown in arrow 1. If the event is a timer event, then the application manager 502 invokes the step (action) of the relevant application that was already invoked, as shown in arrow 1.1.1. If the event is to initiate the execution of an application, then the application manager 502 invokes the relevant application, as shown in arrow 1.2.1. If a currently running application is to be paused, then the application manager 502 sends the pause command to the application, as shown in arrow 1.3.1. If a previously paused application is to be resumed, then the application manager 502 sends the resume command to the application, as shown in arrow 1.4.1.

In any case, successful execution of the step is returned to the application manager 502, as shown by the relevant return arrows above. The application manager 502 then notifies the EventHandler 506 of the successful execution, or alternatively of the failure.

These different applications are important for enabling the adaptive system to control various aspects of the operation of the mobile information device. However, the adaptive system also needs to be able to communicate directly with various mobile information device components, through the operating system of the mobile information device. Such communication may be performed through a communication system 600, shown with regard to FIG. 6, preferably with the action algorithms described below.

Figure 6A:
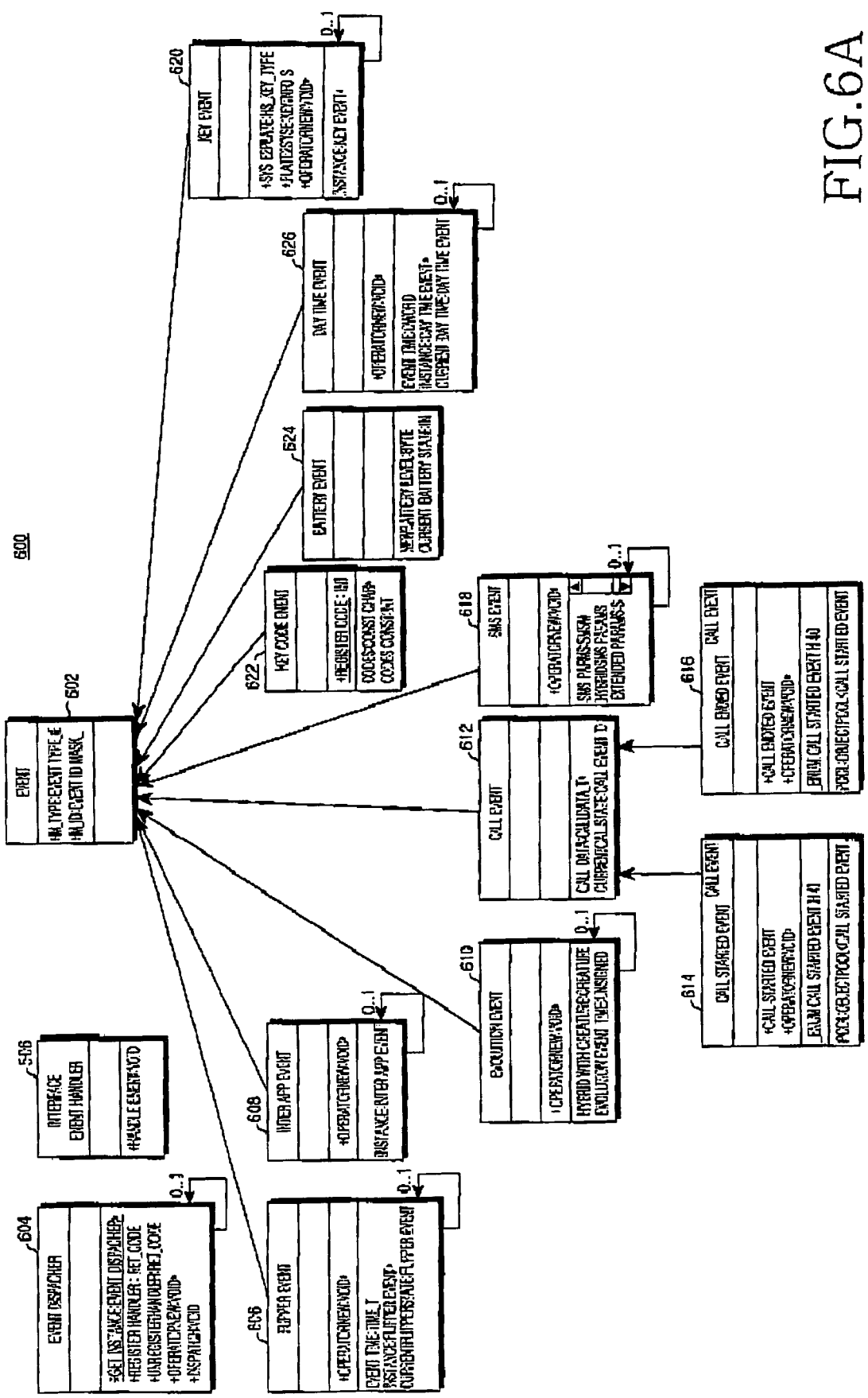
FIGS. 6A and 6B show an exemplary infrastructure required for the adaptive system according to the present invention to perform one or more actions through the operating system of the mobile information device and an exemplary sequence diagram thereof according to the present invention.
Figure 6B:
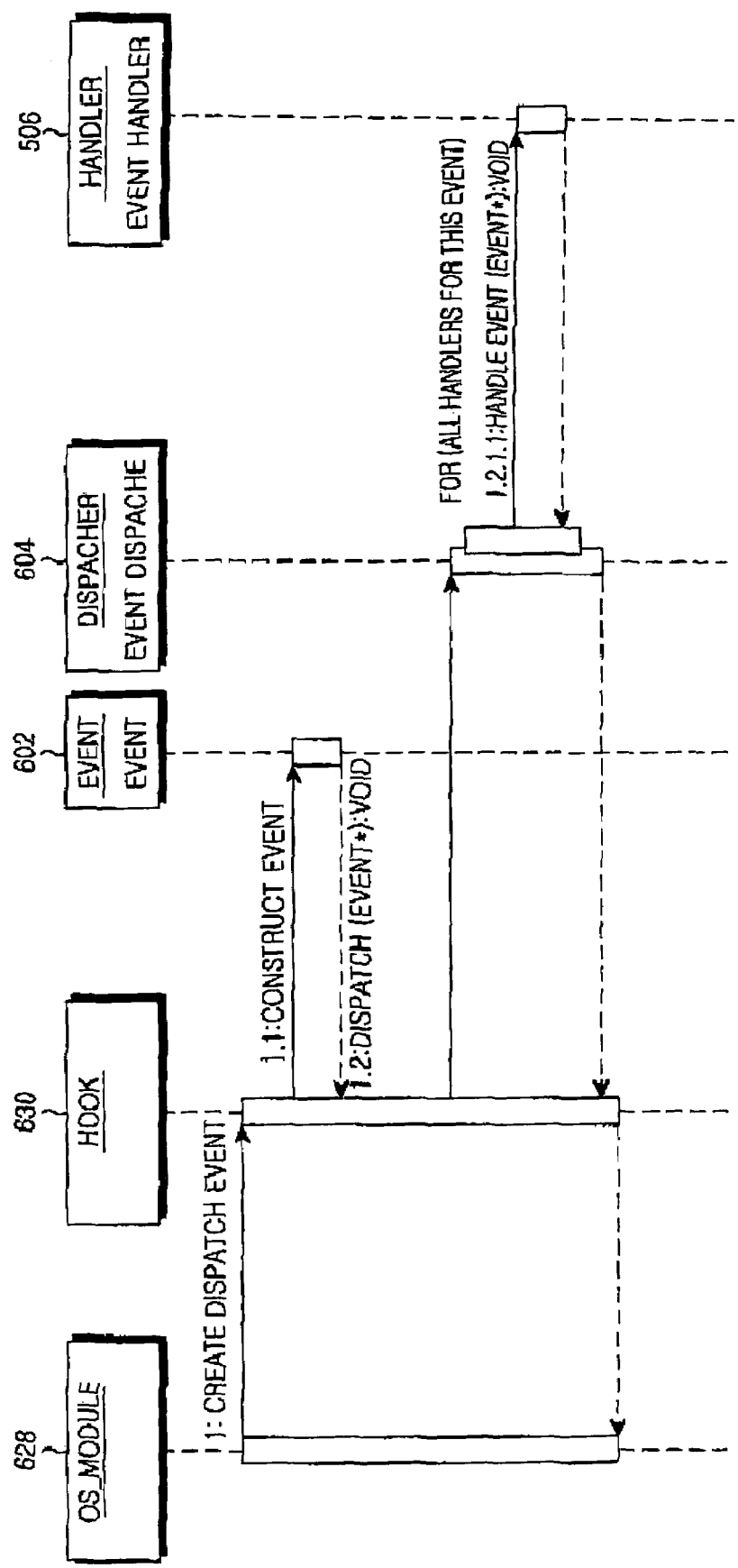

FIGS. 6A and 6B show an exemplary implementation of the infrastructure required for the adaptive system according to the present invention to perform one or more actions through the operating system of the mobile information device, as well as a sequence diagram for operation of the communication system 600. According to embodiments of the present invention, this infrastructure is an example of a more general concept of "AI wrappers", or the ability to "wrap" an existing UI (user interface) system with innovative AI and machine learning capabilities.

The communication system 600 is capable of handling various types of events, with a base class event 602 that communicates with the EventHandler 506 as previously described. The EventDispatcher 604 then routes the event to the correct object within the system of the present invention. Routing is determined by registration of the object with the EventDispatcher 604 for a particular event. The EventDispatcher 604 preferably manages a registry of handlers that implement the EventHandler 506 interface for such notification.

Specific events for which particular handlers are implemented include a flipper event handler 606 for cellular telephones in which the device can be activated or an incoming call answered by opening a "flipper"; when the flipper is opened or closed, this event occurs. Applications being operated according to the present invention may send events to each other, which are handled by an InterAppEvent handler 608. An event related to the evolution (change) of the creature or avatar is handled by an EvolutionEvent handler 610. An incoming or outgoing telephone call is handled by a CallEvent handler 612, which in turn has two further handlers, a CallStartedEvent handler 614 for starting a telephone call and a CallEndedEvent handler 616 for ending a telephone call.

An SMS event (incoming or outgoing message) is handled by an SMSEvent handler 618. Parameters which may be included in the event comprise parameters related to hybridization of the creature or avatar of one mobile information device with the creature or avatar of another mobile information device, as described in greater detail below.

Events related to operation of the keys are preferably handled by a KeyEvent handler 620 and/or a KeyCodeEvent handler 622. For example, if the user depresses a key on the mobile information device, the KeyEvent handler 620 preferably handles this event, which relates to incoming information for the operation of the system according to the present invention. In the sequence diagram, the key_event is an object from class KeyEvent, which represents the key event message object. The KeyEvent handler 620 handles the key_event itself, while the KeyCodeEvent handler 622 listens for input code (both input events are obtained through a hook into the operating system).

A BatteryEvent handler 624 handles events related to the battery, such as a low battery, or alternatively switching from a low power consumption mode to a high power consumption mode.

DayTimeEvent handler 626 relates to alarm, calendar or reminder/appointment diary events.

FIG. 6B is an exemplary sequence diagram, which shows how events are handled between the mobile information device operating system or other control structure and the system of the present invention. In this example, the mobile information device has an operating system, although a similar operation flow could be implemented for devices that lack such an operating system. If present, the operating system handles the input and output to/from the device, and manages the state and events which occur for the device. The sequence diagram in FIG. 6B is an abstraction for facilitating the handling of, and the relation to, these events.

An operating system module (os_module) 628 causes or relates to an event; a plurality of such modules may be present, but only one is shown for the purposes of clarity and without intending to be limiting in any way. The operating system module 628 is part of the operating system of the mobile information device. The operating system module 628 sends a notification of an event, whether received or created by operating system module 628, to a hook 630. The hook 630 is part of the system according to the present invention, and is used to permit communication between the operating system and the system according to the present invention. The hook 630 listens for relevant events from the operating system. The hook 630 is capable of interpreting the event from the operating system, and of constructing the event in a message which is comprehensible to event 602. The Hook 630 also dispatches the event to the EventDispatcher 604, which communicates with each handler for the event, shown as the EventHandler 506 (although there may be a plurality of such handlers). The EventDispatcher 604 then reports to the hook 630, which reports to the operating system module 628 about the handling of the event.

Figure 7A:
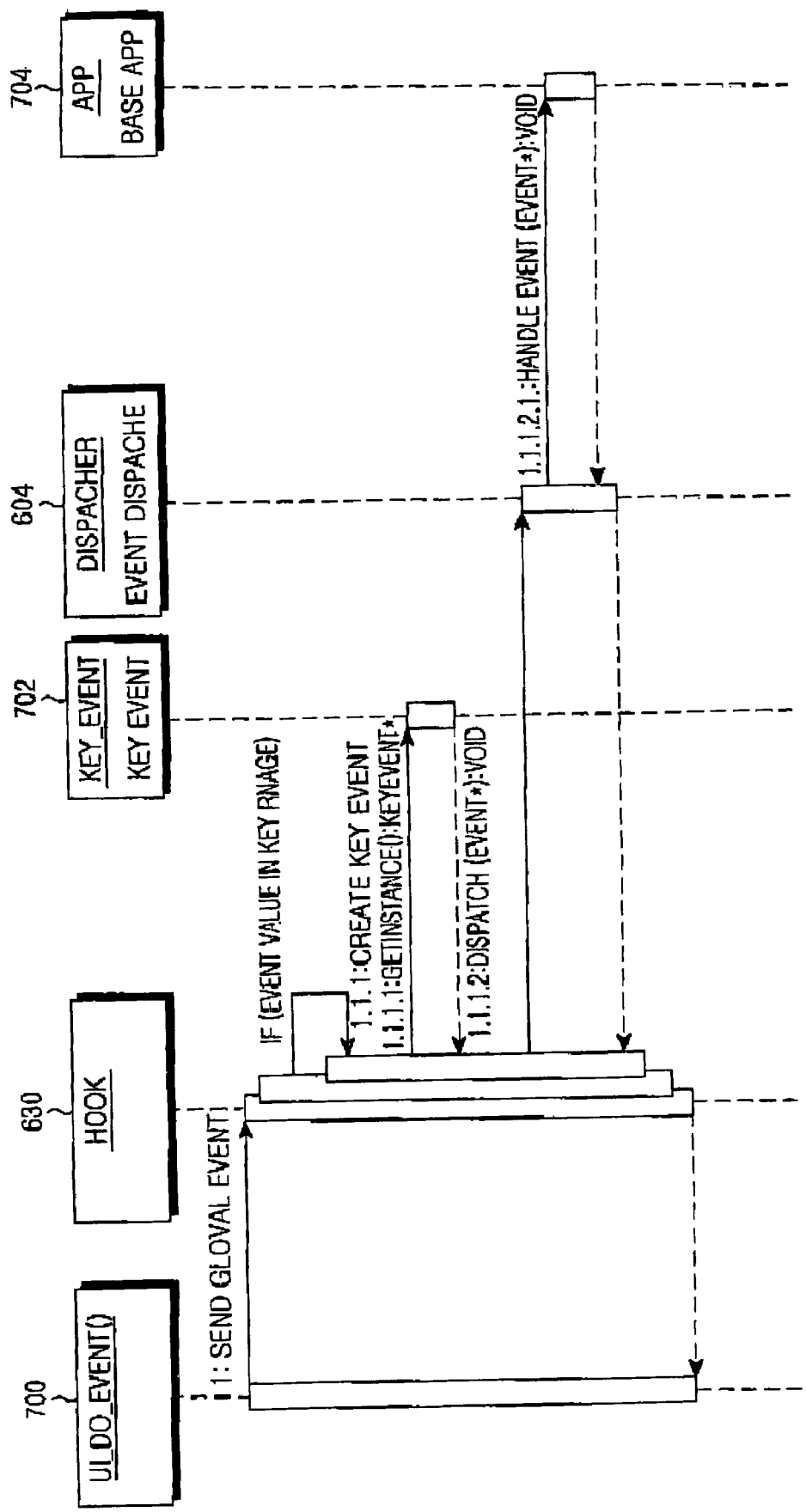
FIGS. 7A, 7B and 7C show exemplary events, and how they are handled by interactions between the mobile information device (through the operating system of the device) and the system of the present invention.
Figure 7B:
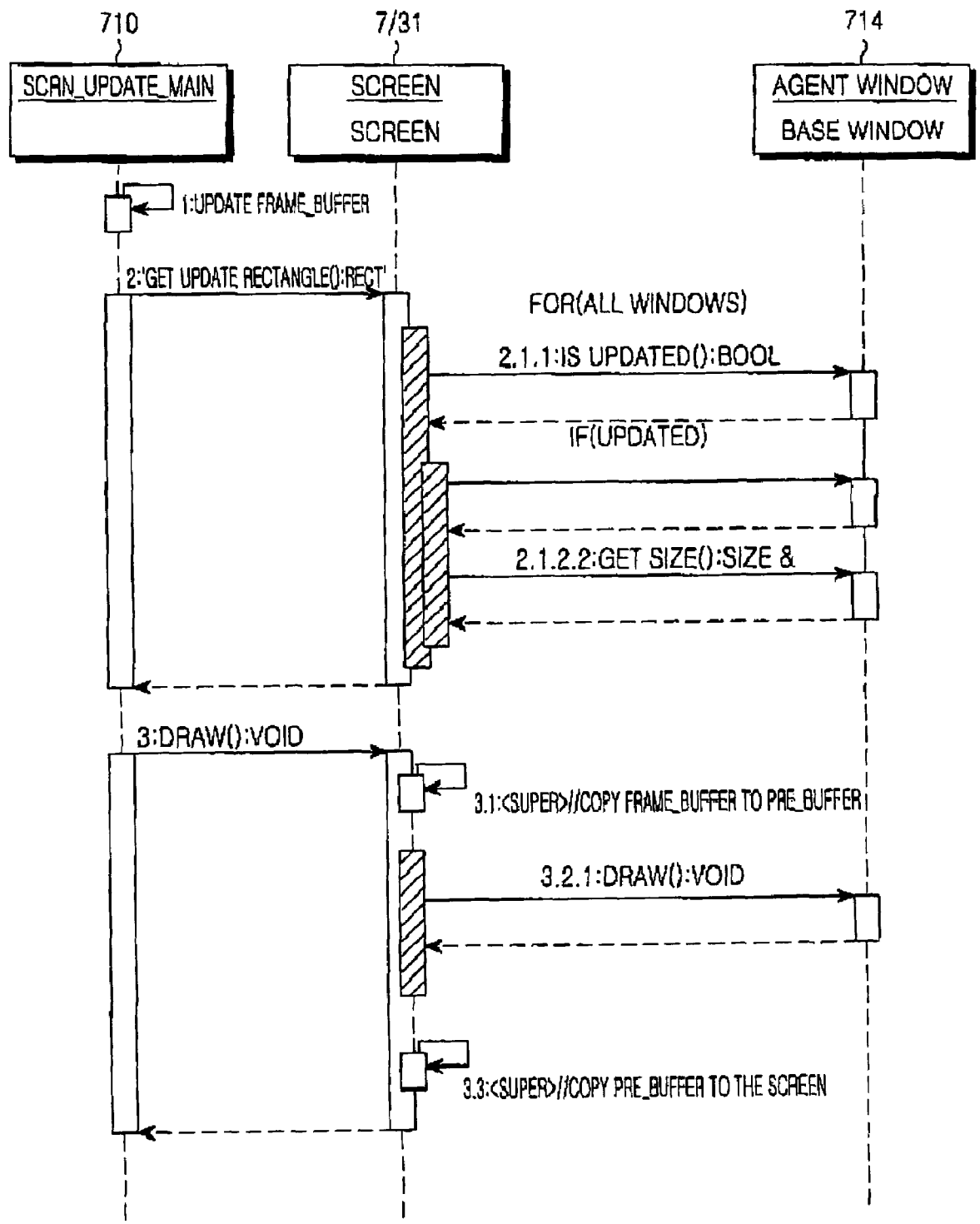
Figure 7C:
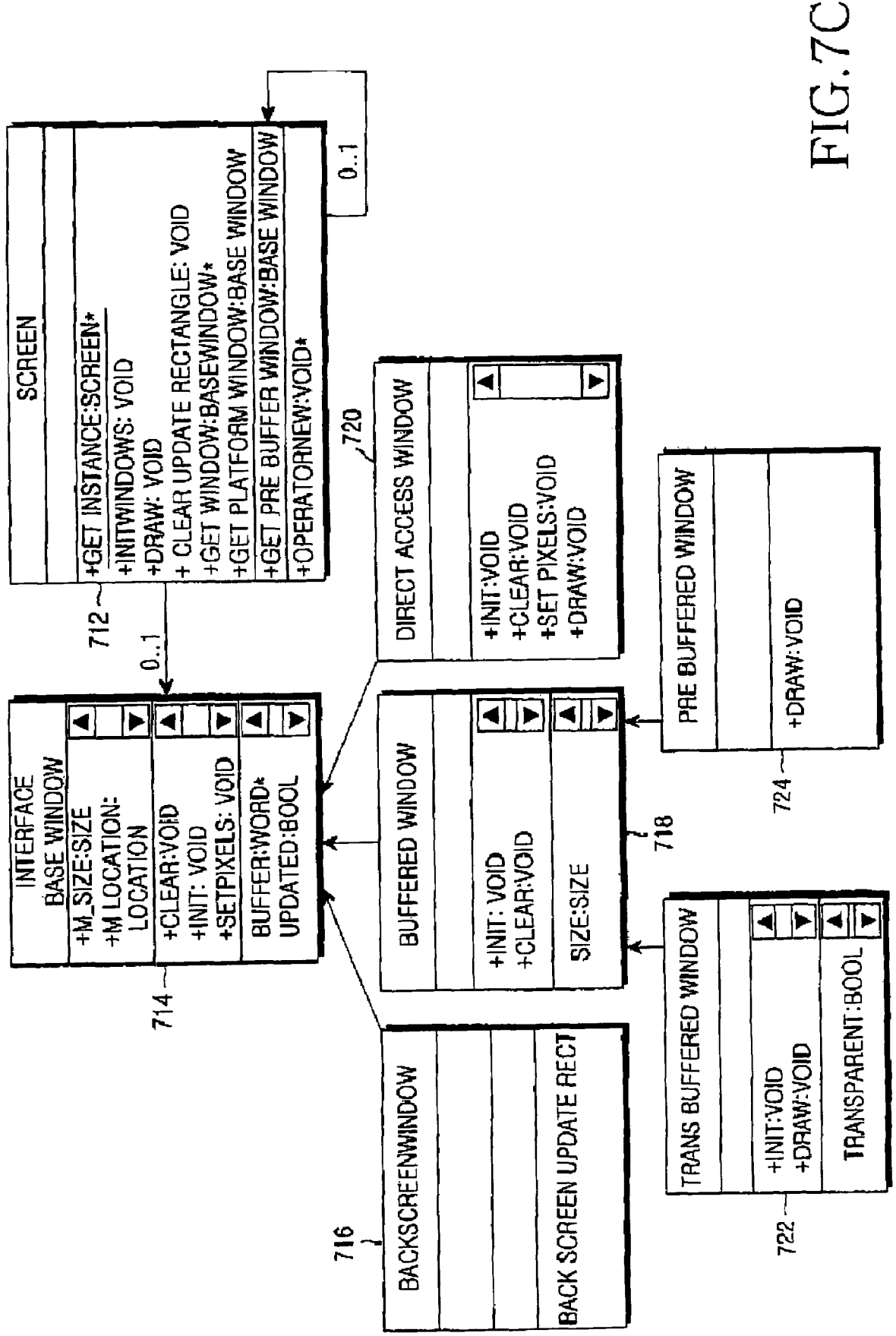

FIGS. 7A, 7B and 7C show exemplary events, and how they are handled by interactions between the mobile information device (through the operating system of the device) and the system of the present invention. It should be noted that some events may be handled within the system of the present invention, without reference to the mobile information device.

FIG. 7A shows an exemplary key event sequence diagram, described according to a mobile information device that has the DMSS operating system infrastructure from Qualcomm Inc., for their MSM (messaging state machine) CDMA (code division multiple access) mobile platform. This operating system provides operating system services such as user interface service, I/O services and interactive input by using the telephone keys (keypad). This example shows how an input event from a key is generated and handled by the system of the present invention. Other events are sent to the system in almost an identical manner, although the function of the hook 630 alters according to the operating system module which is sending the event; a plurality of such hooks is present, such that each hook has a different function with regard to interacting with the operating system.

As shown in FIG. 7A, a ui_do_event module 700 is a component of the operating system and is periodically invoked. When a key on the mobile device is pressed, the user interface (UI) structure which transfers information to the ui_do_event module 700 contains the value of the key. The hook 630 then receives the key value, optionally and preferably identifies the event as a key event (particularly if the ui_do_event module 700 dispatches a global event) and generates a key event 702. The key event 702 is then dispatched to the EventDispatcher 604. The event is then sent to an application 704 which has requested to receive notification of such an event, preferably through an event handler (not shown) as previously described. Notification of success (or failure) in handling the event is then preferably returned to the EventDispatcher 604 and hence to the hook 630 and the ui_do_event module 700.

FIG. 7B shows a second illustrative example of a sequence diagram for handling an event; in this case, the event is passed from the system of the present invention to the operating system, and is related to drawing on the screen of the mobile information device. Information is passed through the screen access method of the operating system, in which the screen is (typically) represented by a frame buffer. The frame buffer is a memory segment that is copied by using the screen driver (driver for the screen hardware) and displayed by the screen. The system of the present invention produces the necessary information for controlling drawing on the screen to the operating system.

Turning now to FIG. 7B, as shown by arrow "1", the operating system (through scrn_update_main module 710) first updates the frame buffer for the screen. This updating may involve drawing the background for example, which may be displayed on every part of the screen to which data is not drawn from the information provided by the system of the present invention. The presence of such a background supports the use of semi-transparent windows, which may be used for the creature or agent as described in greater detail below.

The Scrn_update_main module 710 then sends a request for updated data to a screen module 712, which is part of the system of the present invention and which features a hook for communicating with the operating system. The screen module 712 then sends a request to each application window, shown as an agentWindow 714, of which a plurality may be present, for updated information about what should be drawn to the screen. If a change has occurred, such that an update is required, then the agentWindow 714 notifies the screen module 712 that the update is required. The screen module 712 then asks for the location and size of the changed portion, preferably in two separate requests (shown as arrows 2.1.2.1 and 2.1.2.2 respectively), for which answers are sent by the agentWindow 714.

The screen module 712 returns the information to the operating system through the scrn_update_main 710 in the form of an updated rectangle, as follows. The Scrn_update_main 710 responds to the notification about the presence of an update by copying the frame buffer to a pre-buffer (process 3.1). The screen module 712 then draws the changes for each window into the pre-buffer, shown as arrow 3.2.1. The pre-buffer is then copied to the frame buffer and hence to the screen (arrow 3.3).

FIG. 7C shows the class architecture for the system of the present invention for drawing on the screen. The screen module 712 and the agentWindow 714 are both shown. The class agentWindow 714 also communicates with three other window classes, which provide information regarding updating (changes to) windows: BackScreenWindow 716, BufferedWindow 718 and DirectAccessWindow 720. The BufferedWindow 718 has two further window classes with which it communicates: TransBufferedWindow 722 and PreBufferedWindow 724.

Section 2: Action Selection System

This Section describes a preferred embodiment of an action selection system according to the present invention, including but not limited to a description of optional action selection according to incentive(s)/disincentive(s), and so forth. In order to assist in explaining how the actions of the intelligent agent are selected, an initial explanation is provided with regard to the structure of the intelligent agent, and the interactions of the intelligent agent with the virtual environment which is provided by the system of the present invention.

Figure 8A:
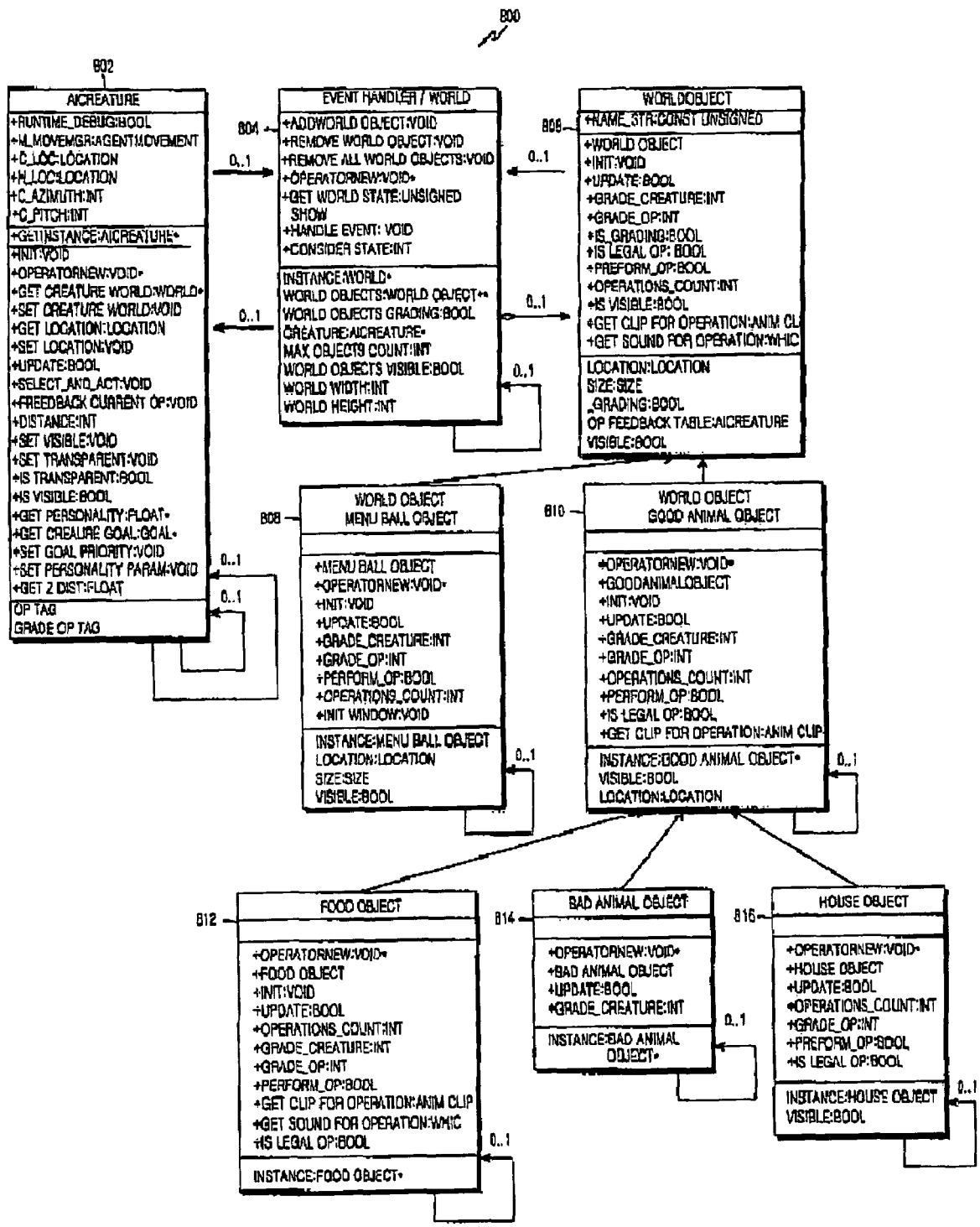
FIGS. 8A and 8B describe an exemplary structure of the intelligent agent and also includes an exemplary sequence diagram for the operation of the intelligent agent.
Figure 8B:
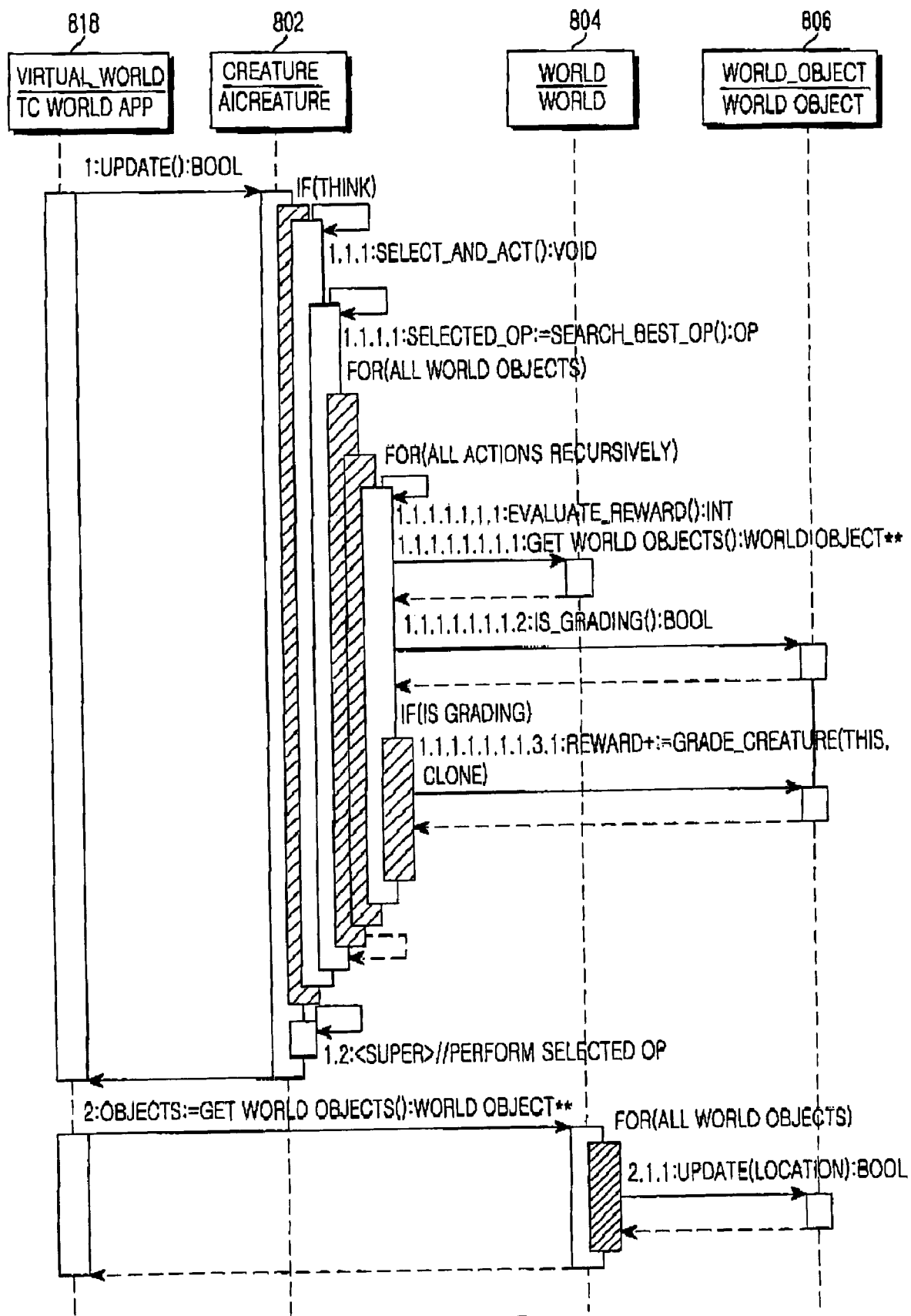

FIG. 8A describes an exemplary structure of the intelligent agent and FIG. 8B includes an exemplary sequence diagram for the operation of the intelligent agent. As shown with regard to FIG. 8A, an intelligent agent 800 includes a plurality of classes. The main class is AICreature 802, which includes information about the intelligent agent such as its state, personality, goals etc, and also information about the appearance of the creature which visually represents the agent, such as location, color, whether it is currently visible and so forth.

The AICreature 802 communicates with World 804, which is the base class for the virtual environment for the intelligent agent. The World 804 in turn communicates with the classes which comprise the virtual environment, of which some non-limiting examples are shown. The World 804 preferably communicates with various instances of a WorldObject 806, which represents an object that is found in the virtual environment and with which the intelligent agent may interact. The World 804 manages these different objects and also receives information about their characteristics, including their properties such as location and so forth. The World 804 also manages the properties of the virtual environment itself, such as size, visibility and so forth. The visual representation of the WorldObject 806 may optionally use two dimensional or three dimensional graphics, or a mixture thereof, and may also use other capabilities of the mobile information device, such as sound production and so forth.

The WorldObject 806 itself may represent an object which belongs to one of several classes. This abstraction enables different object classes to be added to or removed from the virtual environment. For example, the object may be a "ball" which for example may start as part of a menu and then be "removed" by the creature in order to play with it, as represented by a MenuBallObject 808. A GoodAnimalObject 810 also communicates with the WorldObject 806; in turn, classes such as a FoodObject 812 (representing food for the creature), BadAnimalObject 814 (an animal which may annoy the creature and cause them to fight for example) and a HouseObject 816 (a house for the creature) preferably communicate with the GoodAnimalObject 810. The GoodAnimalObject 810 includes the functionality to be able to draw objects on the screen and so forth, which is why other classes and objects preferably communicate with the GoodAnimalObject 810. Of course, many other classes and objects are possible in this system, since other toys may optionally be provided to the creature, for example.

The WorldObject 806 may also relate to the state of the intelligent agent, for example by providing a graded input to the state. This input is graded in the sense that it provides an incentive to the intelligent agent or a disincentive to the intelligent agent; it may also have a neutral influence. The aggregation of a plurality of such graded inputs enables the state of the intelligent agent to be determined. As described with regard to the sequence diagram of FIG. 8B, and also the graph search strategy and action selection strategy diagrams of FIGS. 9A and 9B respectively, the graded inputs are preferably aggregated in order to maximize the reward returned to the intelligent agent from the virtual environment.

These graded inputs may also include input from the user in the form of encouraging or discouraging feedback, so that the intelligent agent has an incentive or disincentive, respectively, to continue the behavior for which feedback has been provided. The calculation of the world state with respect to feedback from the user is o performed as follows:

Grade=(weighting_factor*feedback_reward)+((1−weighting_factor)*world_reward),

In which the feedback_reward results from the feedback provided by the user and the world_reward is the aggregated total reward from the virtual environment as described above; weighting_factor is a value between 0 and 1, which indicates the weight of the user feedback as opposed to the virtual environment (world) feedback.

Non-limiting examples of such reward for the agents action include positive or negative feedback on the agent's suggestion; provision of a world object such as a ball or food to the agent; telephone usage duration; user teaching duration; and the like. Each of these examples can be assigned a predetermined score, and the agent's action can be restricted or expanded according to a corresponding accumulated score. For example, positive and negative feedback provided by the user may be assigned positive and negative point values, respectively; encountering an enemy or bad animal: −20 points; obtaining a food, toy or house object: +5 points; low battery alarm: −1 point; correct and incorrect answers, when the agent teaches the user: +1 point and −1 point, respectively; inactivity for 20 minutes: −1 point; wrong dialing: −1 point; SMS use: +1 point; and the like. The above examples may be applied in other ways.

FIG. 8B shows an illustrative sequence diagram for an exemplary set of interactions between the virtual world and the intelligent agent of the present invention. The sequence starts with a request from a virtual world module 818 to the AICreature 802 for an update on the status of the intelligent agent. A virtual world module 818 controls and manages the entire virtual environment, including the intelligent agent itself.

The intelligent agent then considers an action to perform, as shown by arrow 1.1.1. The action is preferably selected through a search (arrow 1.1.1.1) through all world objects, and then recursively through all actions for each object, by interacting with the World 804 and the WorldObject 806. The potential reward for each action is evaluated (arrow 1.1.1.1.1.1) and graded (arrow 1.1.1.1.1.2). The action with the highest reward is selected. The overall grade for the intelligent agent is then determined and the AICreature 802 performs the selected action.

The Virtual_world 818 then updates the location and status of all objects in the world, by communicating with the World 804 and the WorldObject 806.

Figure 9A:
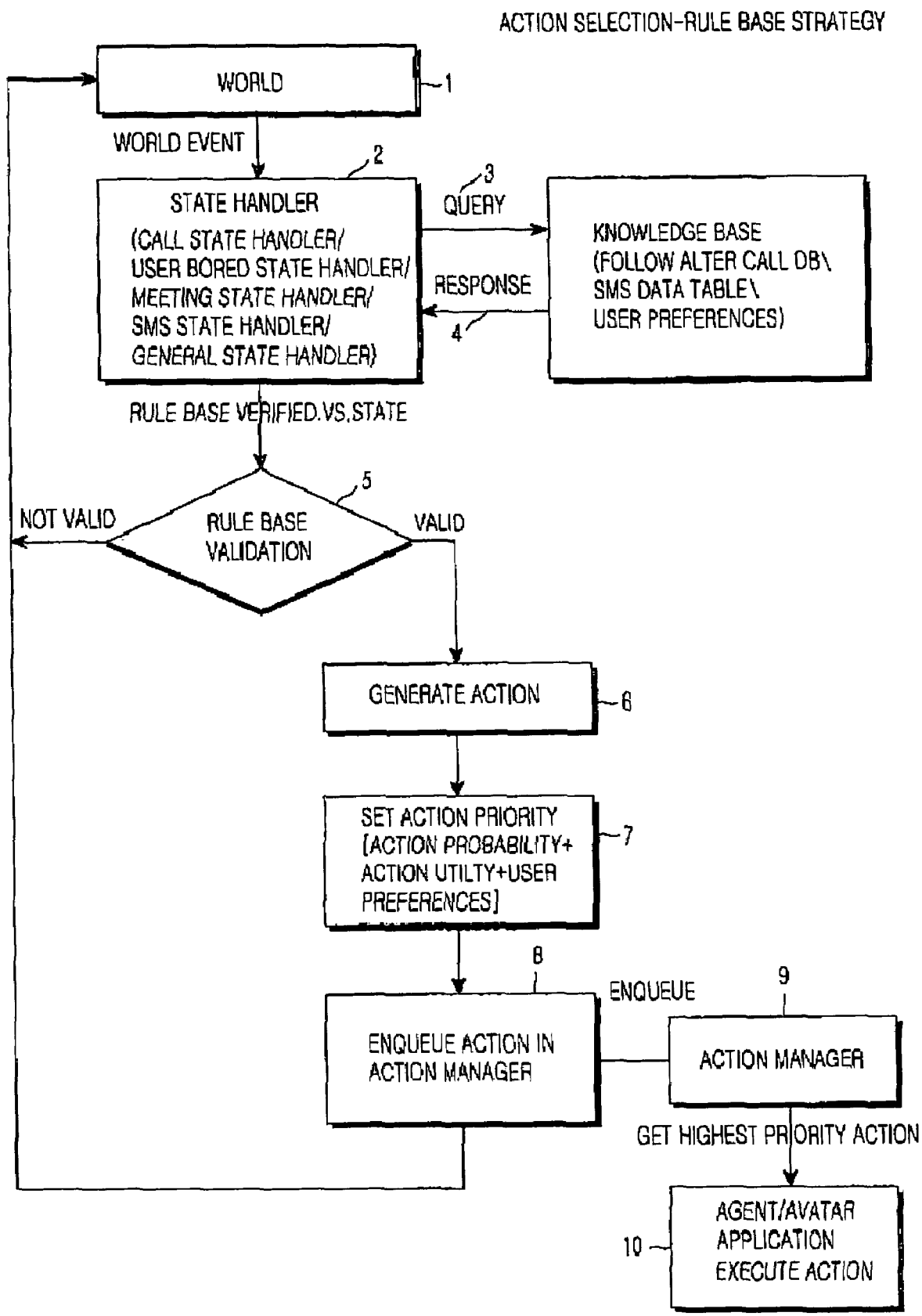
FIGS. 9A and 9B show two exemplary methods for selecting an action according to the present invention.
Figure 9B:
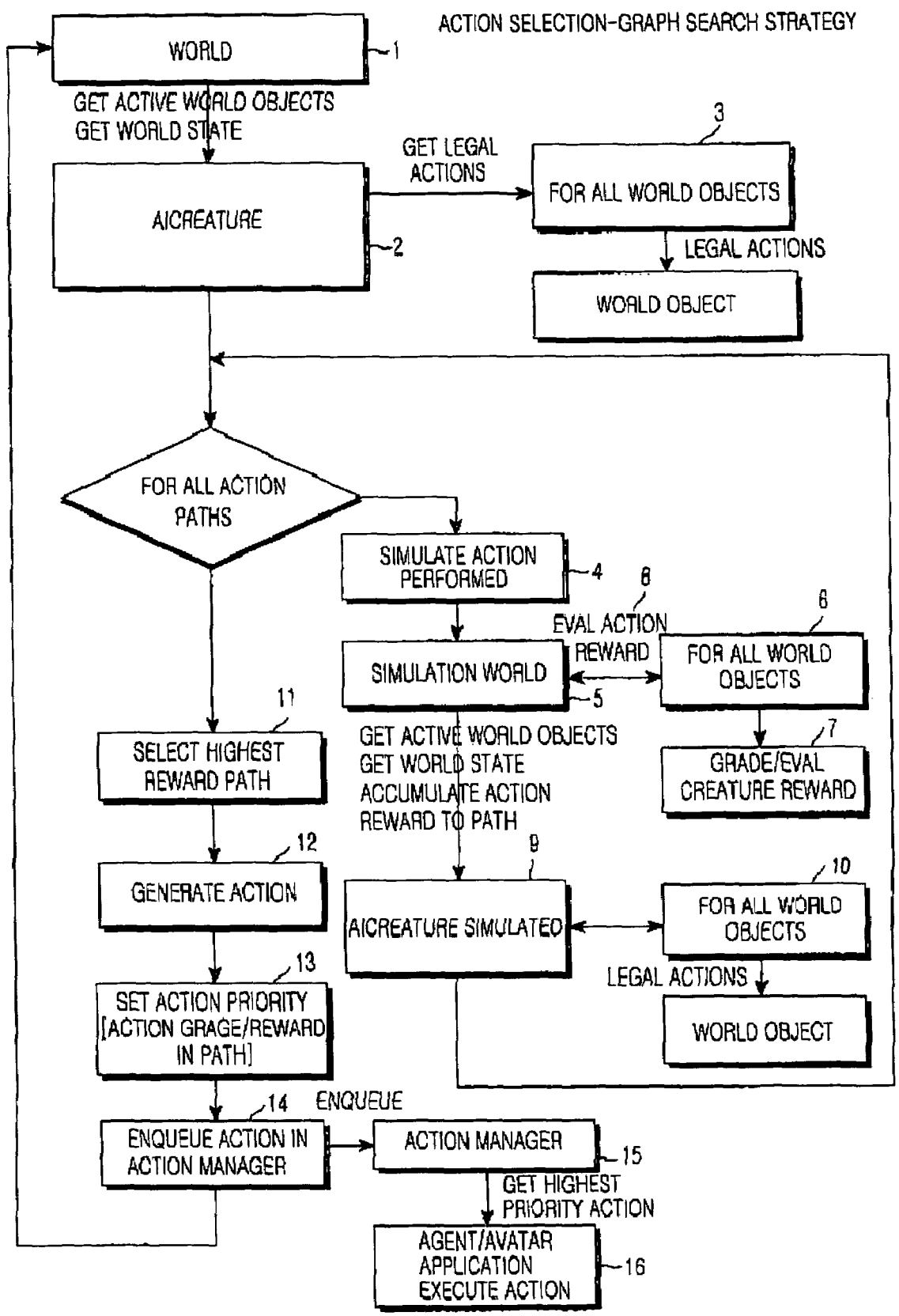

The search through various potential actions may optionally be performed according to one or more of a number of different methods. FIGS. 9A and 9B show two exemplary methods for selecting an action according to the present invention.

FIG. 9A shows an exemplary method for action selection, termed herein a rule based strategy for selecting an action. In stage 1, the status of the virtual environment is determined by the World state. A World Event occurs, after which the State Handler which is appropriate for that event is invoked in stage 2. The State Handler preferably queries a knowledge base in stage 3. The knowledge base may be divided into separate sections and/or separate knowledge bases according to the State Handler which has been invoked. In stage 4, a response is returned to the State Handler.

In stage 5, rule base validation is performed, in which the response (and hence the suggested action which in turn brings the intelligent agent into a specific state) is compared against the rules. If the action is not valid, then the process returns to stage 1. If the action is valid, then in stage 6 the action is generated. The priority for the action is then determined in stage 7; more preferably, the priority is determined according to a plurality of inputs, including but not limited to, an action probability, an action utility and a user preference. In stage 8, the action is placed in a queue for the action manager. In stage 9, the action manager retrieves the highest priority action, which is then performed by the intelligent agent in stage 10.

FIG. 9B shows an exemplary action selection method according to a graph search strategy. Again, in stage 1 the process begins by determining the state of the world (virtual environment), including the state of the intelligent agent and of the objects in the world. In stage 2, the intelligent agent is queried. In stage 3, the intelligent agent obtains a set of legal (permitted or possible) actions for each world object; preferably each world object is queried as shown.

The method now branches into two parts. A first part, shown on the right, is performed for each action path. In stage 4, an action to be performed is simulated. In stage 5, the effect of the simulation is determined for the world, and is preferably determined for each world object in stage 6. In stage 7, a grade is determined for the effect of each action.

In stage 8, the state of the objects and hence of the world is determined, as is the overall accumulated reward of an action. In stage 9, the effect of the action is simulated on the intelligent agent; preferably the effect between the intelligent agent and each world object is also considered in stage 10.

Turning now to the left branch of the method, in stage 11, all of this information is preferably used to determine the action path with the highest reward. In stage 12, the action is generated. In stage 13, the action priority is set, preferably according to the action grade or reward. In stage 14, the action is placed in a queue at the action manager, as in FIG. 9A. In stage 15, the action is considered by the action manager according to priority; the highest priority action is selected, and is executed in stage 16.

Figure 10:
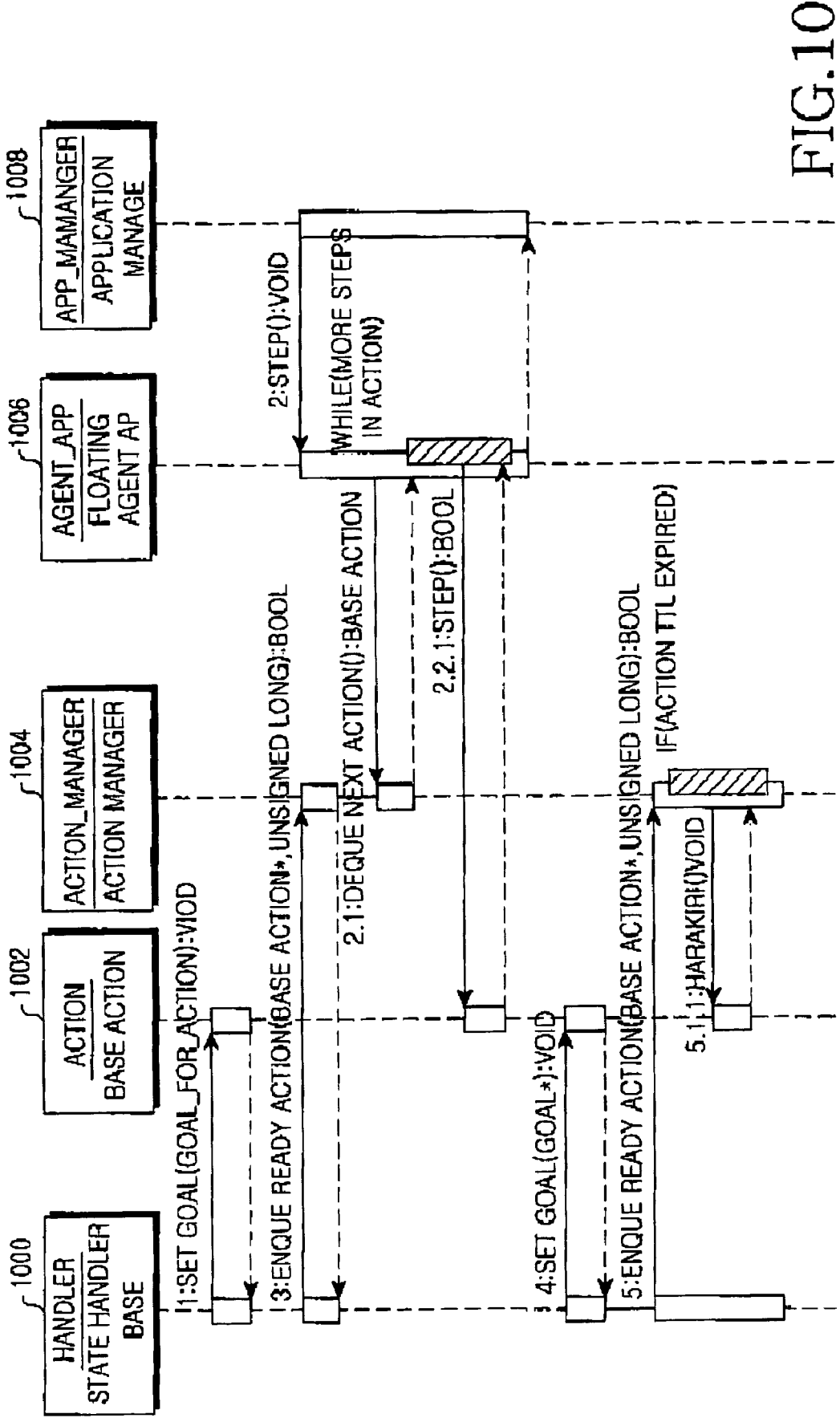
FIG. 10 shows a sequence diagram of an exemplary action execution method according to the present invention.

Next, a description is provided of an exemplary action execution method and structure. FIG. 10 shows a sequence diagram of an exemplary action execution method according to the present invention. A handler 1000 send a goal for an action to an action module 1002 in arrow 1, which features a base action interface. The base action interface enables the action module 1002 to communicate with the handler 1000 and also with other objects in the system, which are able to generate and post actions for later execution by the intelligent agent, shown here as a FloatingAgentApp 1006. These actions are managed by an action manager 1004.

The action manager 1004 has two queues containing action objects. One queue is the ready for execution queue, while the other queue is the pending for execution queue. The latter queue may be used for example if an action has been generated, but the internal state of the action is pending so that the action is not ready for execution. When the action state matures to be ready for execution, the action is preferably moved to the ready for execution queue.

An application manager 1008 interacts with the FloatingAgentApp 1006 for executing an action, as shown in arrow 2. The FloatingAgentApp 1006 then requests the next action from the action manager 1004 (arrow 2.1); the action itself is provided by the action module 1002 (arrow 2.2.1). Actions are enqueued from the handler 1000 to the action manager 1004 (arrow 3). Goals (and hence at least a part of the priority) are set for each action by communication between the handler 1000 and the action module 1002 (arrow 4). Arrows 5 and 6 show the harakiri ( ) method, described in greater detail below.

As previously described, the actions are queued in priority order. The priority is determined through querying the interface of the action module 1002 by the action manager 1004. The priority of the action is determined according to a calculation which includes a plurality of parameters. For example, the parameters may include the priority as derived or inferred by the generating object, more preferably based upon the predicted probability for the success of the action; the persistent priority for this type of action, which is determined according to past experience with this type of action (for example according to user acceptance and action success); and the goal priority, which is determined according to the user preferences.

One optional calculation for managing the above parameters is as follows:

$$P(all) = P(\text{action probability}) * ((P(\text{persistent priority}) + P(\text{action goal})/10))/2)$$

Complementary for the priority based action execution, each action preferably has a Time To Live (ttl) period; this ttl value stands for the amount of execution time passed between the time when the action was posted in the ready queue and the expiration time of this action. If an action is ready but does not receive a priority for execution until its ttl has expired, the action manager 1004 preferably invokes the method harakiri( ), which notifies the action that it will not be executed. Each such invocation of harakiri( ) preferably decreases the priority of the action until a threshold is reached. After this threshold has been reached, the persistent priority starts to increase. This model operates to handle actions that were proposed or executed but failed since the user aborted the action. The persistent priority decreases by incorporating the past experience in the action priority calculation.

This method shows how actions that were suggested or executed adapt to the specific user's implicit preferences in realtime.

This model is not complete without the harakiri( ) mechanism since if an action persistent priority reduces, so the action does not run, it needs to be allowed to either be removed or else possibly run again, for example if the user preferences change. After several executions of harakiri( ), the action may regain the priority to run.

The previous Sections provide infrastructure, which enables various actions and mechanisms to be performed through the adaptive system of the present invention. These actions and mechanisms are described in greater detail below.

Section 3: Emotional System

This Section describes a preferred embodiment of an emotional system according to the present invention, including but not limited to a description of specific emotions and their intensity, which are combinable to form an overall mood. The emotional system can also include a mechanism for allowing moods to change as well as for controlling one or more aspects of such a change, such as the rate of change for example.

Figure 11A:
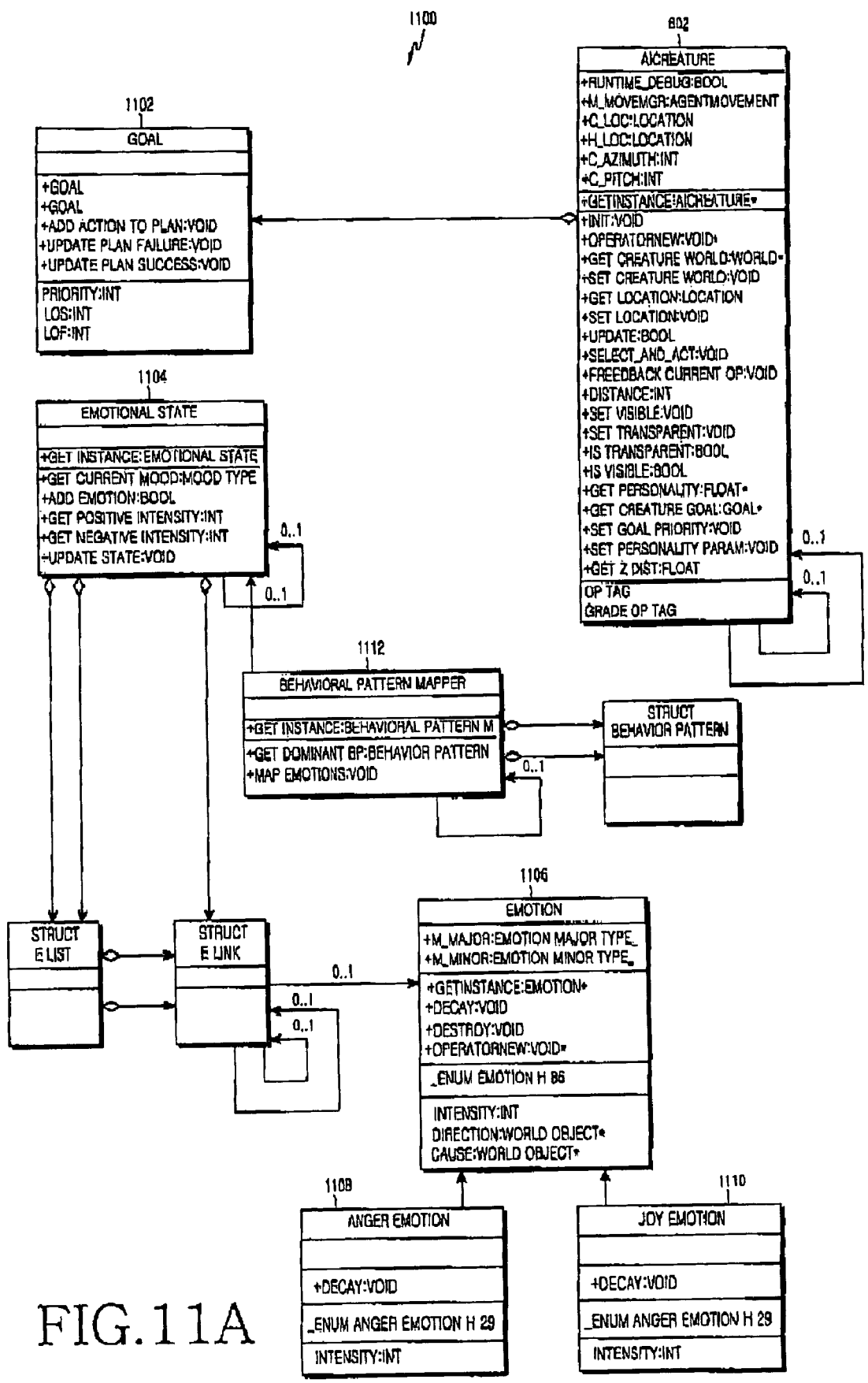
FIGS. 11A, 11B 11C are diagrams for describing an exemplary, illustrative implementation of an emotional system according to the present invention.
Figure 11B:
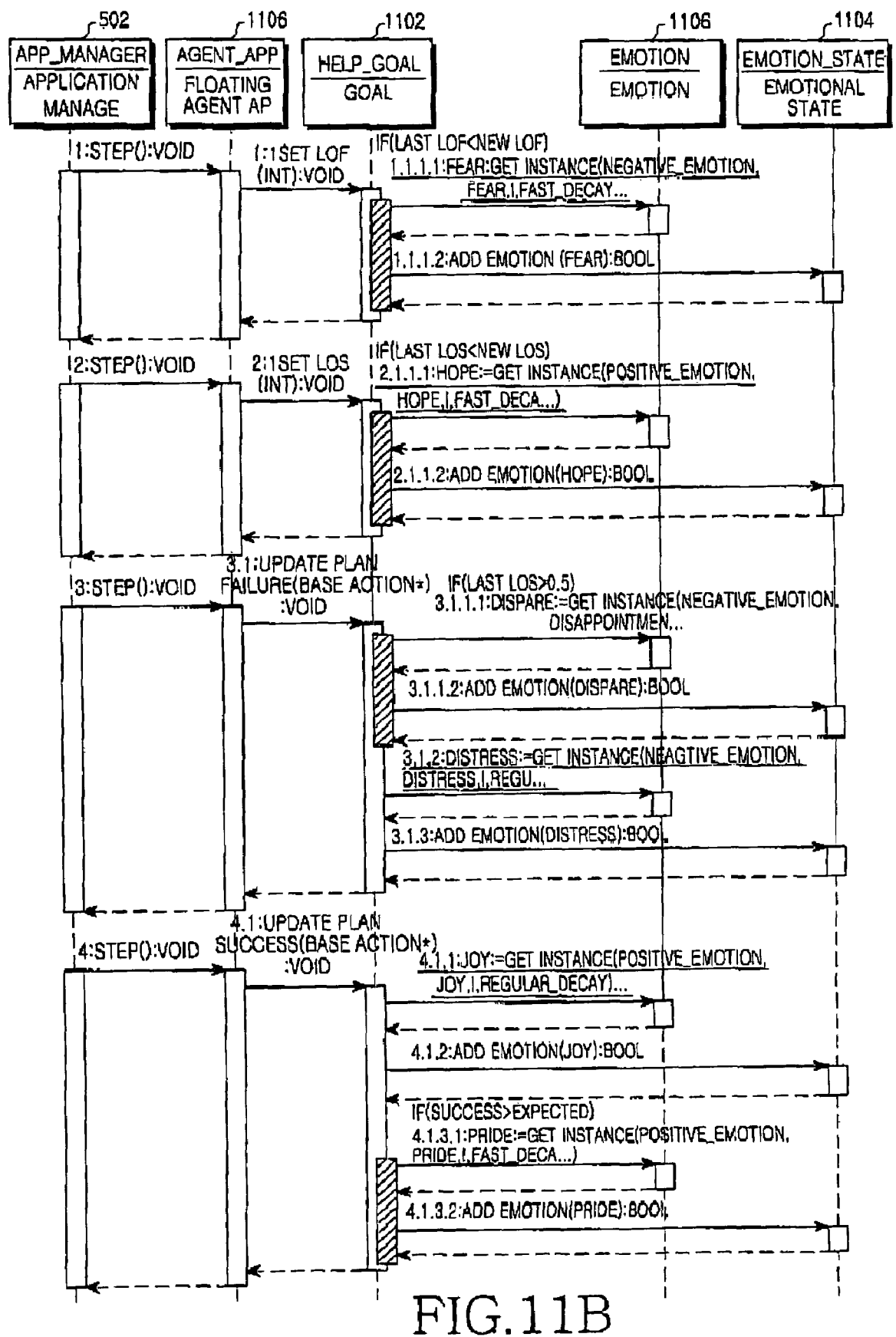
Figure 11C:
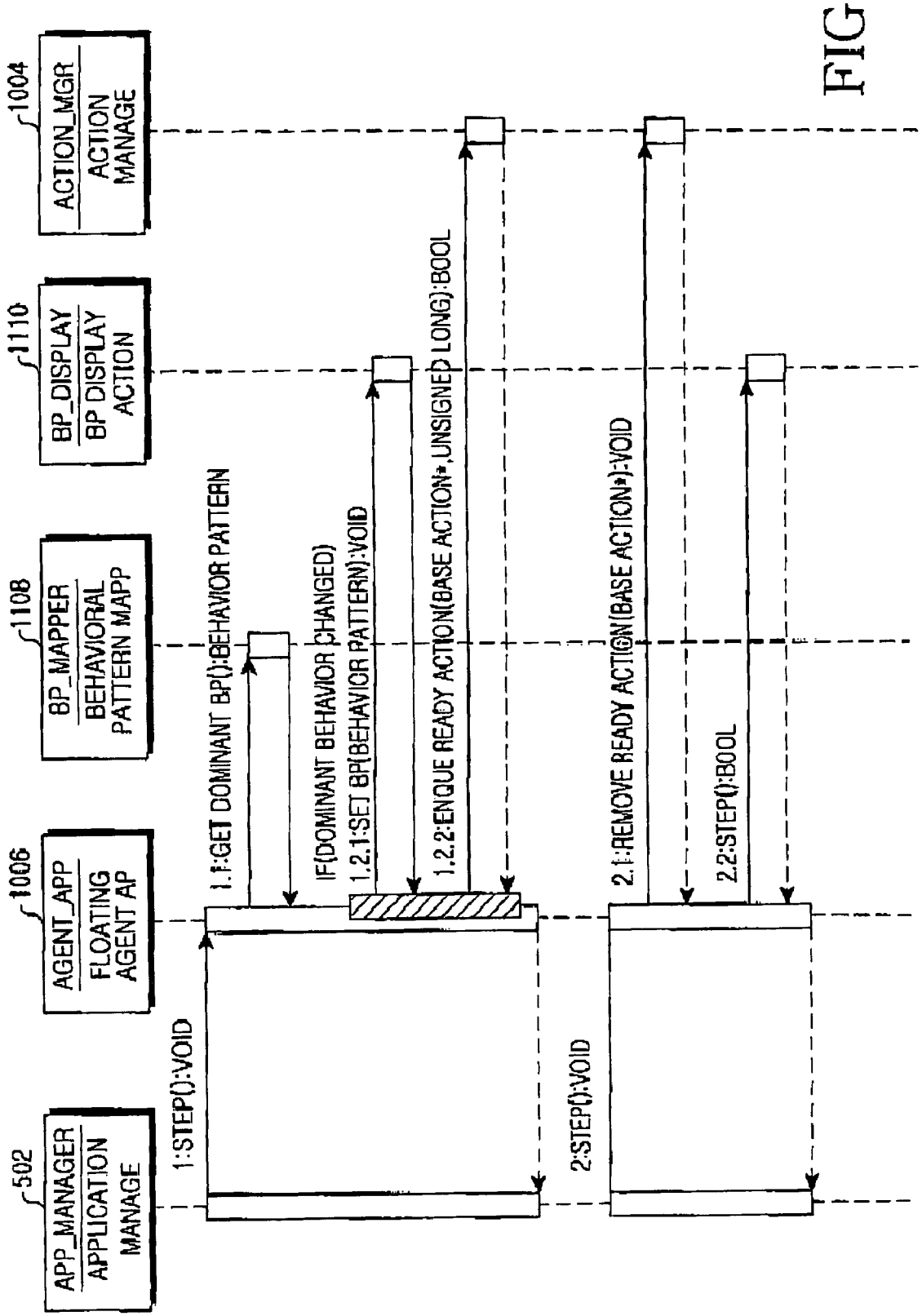

FIGS. 11A-11C feature diagrams for describing an exemplary, illustrative implementation of an emotional system according to the present invention. FIG. 11A shows an exemplary class diagram for the emotional system, while FIGS. 11B and 11C show exemplary sequence diagrams for the operation of the emotional system according to the present invention.

As shown with regard to an emotional system 1100 according to the present invention, the goal class (goal 1102) represents an abstract goal of the intelligent agent. A goal is something which the intelligent agent performs as an action to achieve. The goal 1102 is responsible for creating emotions based on certain events that are related to the state of the goal and its chances of fulfillment.

The goal 1102 interacts with the AICreature 802 (previously described with regard to FIG. 8). Briefly, the intelligent agent seeks to fulfill goals, so the interactions between the AICreature 802 are required in order to determine whether or not goals have been fulfilled, which in turn impact the emotional state of the intelligent agent.

The emotional state itself is handled by the class EmotionalState 1104, which in turn is connected to the class Emotion 1106. The Emotion 1106 is itself preferably connected to classes for specific emotions such as the anger class AngerEmotion 1108 and the joy class JoyEmotion 1110. The EmotionalState 1104 is also preferably connected to a class which determines the pattern of behavior, the BehavioralPatternMapper 1112.

The proactive user interface creates emotions of the agent through the emotional system when the likelihood of success (LOS) of the abstract goal of the intelligent agent increases or decreases and when the likelihood of failure (LOF) thereof increases or decreases. When LOS increases, then the hope emotion is generated. When LOS decreases, the despair emotion is generated. When LOF increases, the fear emotion is generated, and when LOF decreases, then the joy emotion is generated.

Success or failure of a goal has a significant effect on the goal state and generated emotions. When a goal fails, despair is generated, and if the likelihood of success was high, frustration is also generated (since expectation of success was high).

When a goal succeeds, joy is generated, and if expectation and accumulated success were high, then pride is generated.

The Emotion 1106 is a structure that has two properties, which are major and minor types. The major type describes the high level group to which the minor emotion belongs, preferably including POSITIVE_EMOTION and NEGATIVE_EMOTION. Minor types preferably include JOY, HOPE, GLOAT, PRIDE, LIKE, ANGER, HATE, FEAR, FRUSTRATION, DISTRESS, DISAPPOINTMENT. Other properties of the emotion are the intensity given when generated, and the decay policy (i.e. the rate of change of the emotion).

The next phase after emotion generation is performed by the EmotionalState class 1104 that accumulates emotions which were generated over time by the intelligent agent. This class represents the collection of emotion instances that defines the current emotional state of the intelligent agent. The current emotional state is defined by maintaining a hierarchy of emotion types, which are then generalized by aggregation and correlation. For example, the minor emotions are aggregated into a score for POSITIVE_EMOTION and a score for NEGATIVE_EMOTION; these two categories are then correlated to GOOD/BAD MOOD, which describes the overall mood of the intelligent agent.

The EmotionalState class 1104 is queried by the intelligent agent floating application; whenever the dominant behavior pattern changes (by emotions generated, decayed and generalized in the previously described model), the intelligent agent expresses its emotional state and behaves according to that behavioral pattern. The intelligent agent can express its emotional state using one or more of the text communication engine (described in greater detail below), three dimensional animation, facial expressions, two dimensional animated effects and sounds.

FIG. 11B is an exemplary sequence diagram for generation of an emotion by the emotional system according to the present invention. As shown, the application manager 502 sends a step to the FloatingAgentApp 1006 in arrow 1. The FloatingAgentApp 1006 then determines the LOF (likelihood of failure) by querying the goal class 1102 in arrow 1.1. The goal 1102 then determines the LOF; if the new LOF is greater than the previously determined LOF, fear is generated by a request to emotion class 1106 in arrow 1.1.1.1. The fear emotion is also added to the emotional state by communication with EmotionalState 1104 in arrow 1.1.1.2.

Next, the application manager 502 sends another step (arrow 2) to the FloatingAgentApp 1006, which determines the LOS (likelihood of success) by again querying the Goal 1102 in arrow 2.1. The Goal 1102 then determines the LOS; if the new LOS is greater than the previously determined LOS, hope is generated by a request to emotion class 1106 in arrow 2.1.1.1. The hope emotion is also added to the emotional state by communication with EmotionalState 1104 in arrow 2.1.1.2.

Arrow 3 shows the application manager 502 sending another step to the FloatingAgentApp 1006, which requests determination of emotion according to the actual outcome of an action. If the action has failed and the last LOS was greater than some factor, such as 0.5, which indicated that success was expected, then the FloatingAgentApp 1006 causes the Goal 1102 to have despair generated by the Emotion 1106 in arrow 3.1.1.1. The despair emotion is also added to the emotional state by communication with the EmotionalState 1104 in arrow 3.1.1.2. Also, if the action failed (regardless of the expectation of success), distress is generated by the Emotion 1106 in arrow 3.1.2. The distress emotion is also added to the emotional state by communication with the EmotionalState 1104 in arrow 3.1.3.

Next, the application manager 502 sends another step (arrow 4) to the FloatingAgentApp 1006, which updates emotions based on actual success by sending a message to Goal 1102 in arrow 4.1. The Goal 1102 then causes joy to be generated by a request to the emotion class 1106 in arrow 4.1.1. The joy emotion is also added to the emotional state by communication with the EmotionalState 1104 in arrow 4.1.2.

If actual success is greater than predicted, then the Goal 1102 causes pride to be generated by a request to the emotion class 1106 in arrow 4.1.3.1. The pride emotion is also added to the emotional state by communication with the EmotionalState 1104 in arrow 4.1.3.2.

FIG. 11C is an exemplary sequence diagram for expressing an emotion by the emotional system according to the present invention. Such expression is governed by the user preferences. The application manager 502 initiates emotional expression by sending a step (arrow 1) to the FloatingAgentApp 1006, which queries the bp_mapper 1108 as to the behavioral pattern of the intelligent agent in arrow 1.1. If the dominant behavior has changed, then the FloatingAgentApp 1006 sends a request to the bp_display 1110 to set the behavioral pattern (arrow 1.2.1). The bp_display 1110 controls the actual display of emotion. The FloatingAgentApp 1006 then requests an action to be enqueued in a message to action manager 1004 (arrow 1.2.2).

The application manager 502 sends another step (arrow 2) to the FloatingAgentApp 1006, which requests that the action be removed from the queue (arrow 2.1) to the action manager 1004, and that the action be performed by the bp_display 1110.

The following table shows a non-limiting example of the definition of actions that can be taken by the agent according to the levels of reward points obtained by the agent.

TABLE 1

| Level | Basic Actions | Special Actions |
|---|---|---|
| 5 (high) | sitting sleeping | 1st-type dancing, running, 2nd-type jumping, 2nd-type flying |
| 4 | sniffing barking | 2nd-type dancing, running, jumping, flying |
| 3 | being sad being happy | 2nd-type happy, thinking, running, jumping |
| 2 |  | thinking, 1st-type waiting, 2nd-type angry, 2nd-type waiting |
| 1 (low) |  | 2nd-type sad, thinking, angry, 2nd-type waiting |

In this example, the agent can perform the basic actions such as sitting, sleeping, sniffing, barking, being sad, and being happy, irrespective of reward points obtained by the agent. The level of the agent increases by one level as the reward points increase by +200 points, whereas it decreases by one level as the reward points decrease by +200 points (i.e. increase by −200 reward points). A different number of reward points may be set as a basis for the level change. In case the basic level of the agent is set to the 3rd level, the agent can take the basic actions and additional special actions corresponding to the 3rd level, such as 2nd-type happy, thinking, running, and jumping, as shown in Table 1. In this case, if the agent obtains +200 reward points, the level of the agent becomes the 4th level, so that the agent can take the basic actions and additional special actions corresponding to the 4th level, such as 2nd-type dancing, running, jumping, and flying. The action selection system described above determines which action should be taken from among actions available at each level, while the emotional system controls emotional expressions corresponding respectively to the actions. In addition to such actions and emotional expressions, the agent performs an emotional expression based on the following communication with the user.

Section 4: Communication with the User

This Section describes a preferred embodiment of a communication system for communication with the user according to the present invention, including but not limited to textual communication, audio communication and graphical communication. For the purpose of description only and without any intention of being limiting, textual communication is described as an example of these types of communication. The communication with the user described in this section can be used for (but is not limited to) the agent's suggestions, provision of the information of the user, or the agent's emotional expressions.

Figure 12A:
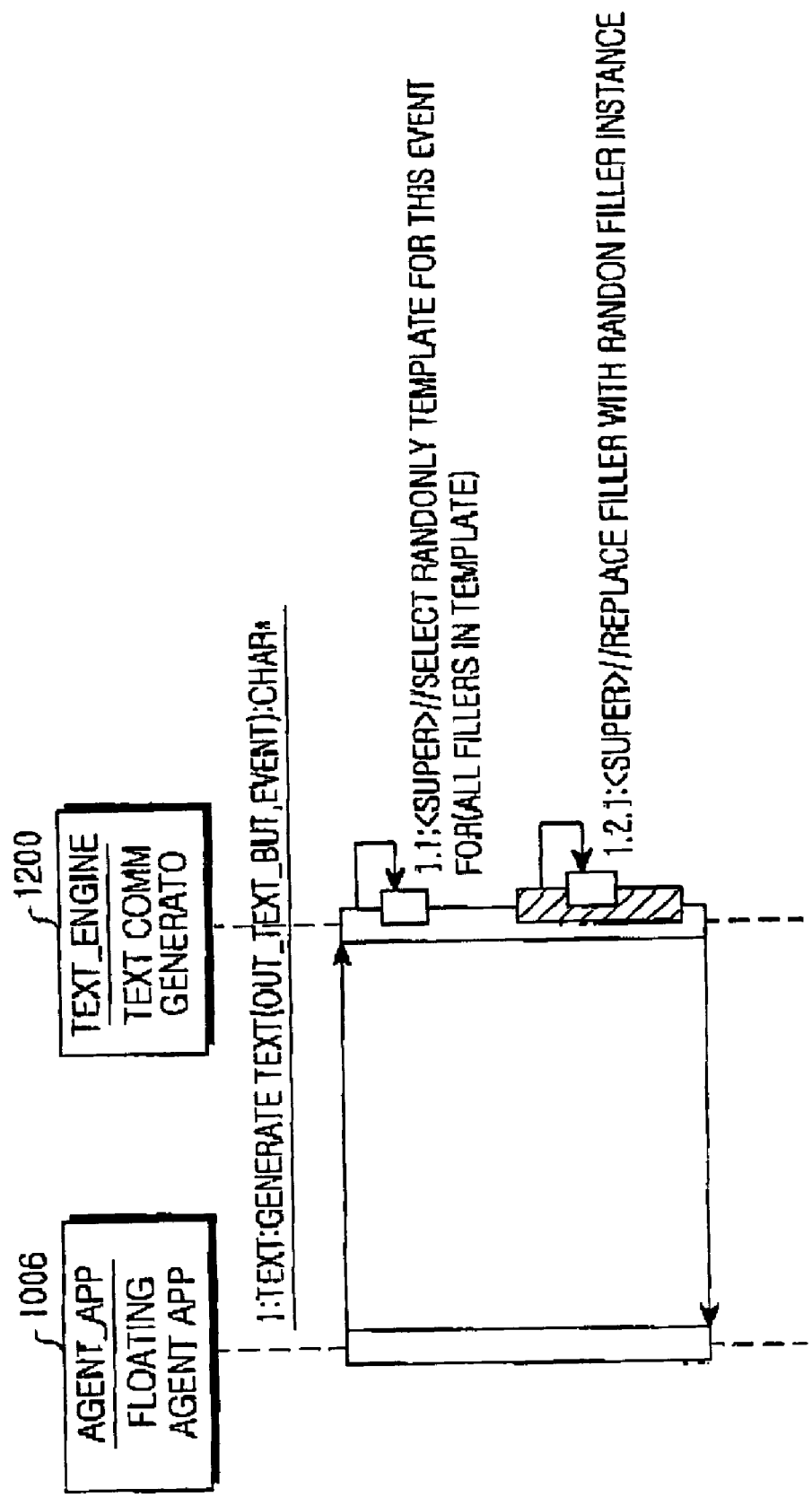
FIG. 12A is an exemplary sequence diagram for textual communication according to the present invention.

FIG. 12A is an exemplary sequence diagram for textual communication according to the present invention. A text engine 1200 is responsible for generating text that is relevant to a certain event and which can be communicated by the intelligent agent. The text engine 1200 includes a natural language generation of sentences or short phrases according to templates that are predefined and contain place holders for fillers. Combining the templates and the fillers together enable the text engine 1200 to generate a large number of phrases, which are relevant to the event to which the template belongs.

This framework can be extensible for many new and/or changing events or subjects because additional templates can also be added, as can additional fillers.

As shown in FIG. 12A, the FloatingAgentApp 1006 communicates with the text engine 1200 by first sending a request to generate text, preferably for a particular event (arrow 1). The text engine 1200 selects a template, preferably from a plurality of templates that are suitable for this event (arrow 1.1). The text engine 1200 also selects a filler for the template, preferably from a plurality of fillers that are suitable for this event (arrow 1.2.1). The filled template is then returned to the FloatingAgentApp 1006.

The following provides an example of generation of text for a mood change event, which is that the intelligent agent is now happy, with some exemplary, non-limiting templates and fillers. Examples of the templates are as follows:

Happy template 1: "% noun1 is %happy_adj2"
Happy template 2: "%self_f_pronoun %happy_adj1"
Examples of the fillers are as follows:
% noun1={"the world", "everything", "life", "this day", "the spirit"}
%happy_adj1={"happy", "joyful", "glad", "pleased", "cheerful", "in high spirits", "blissful", "exultant", "delighted", "cheery", "jovial", "on cloud nine"}
%happy_adj2={"nice", "beautiful", "great", "happy", "joyful", "good", "fun"}
%self_f_pronoun={"I am", "I'm", "your intelligent agent", "your agent friend"}

Examples of some resultant text communication phrases from combinations of templates and fillers as follows:

I'm cheerful
the spirit is joyful
I am exultant
life is beautiful
life is good
I'm pleased
I'm jovial
I am joyful
the world is joyful
I'm glad
the spirit is joyful
the spirit is happy
the world is nice
I am happy As another non-limiting example, a missed call template could be constructed as follows:

%user missed a call from %missed %reaction

In this example, the user's name is used for %user; the name or other identifier (such as telephone number for example) is entered to %missed; %reaction is optional and is used for the reaction of the intelligent agent, such as expressing disappointment for example (e.g. "I'm sad").

As shown by these examples, the text engine 1200 can generate relevant sentences for many events, from missed call events to low battery events, making the user's interaction with the mobile information device richer and more understandable.

Figure 12B:
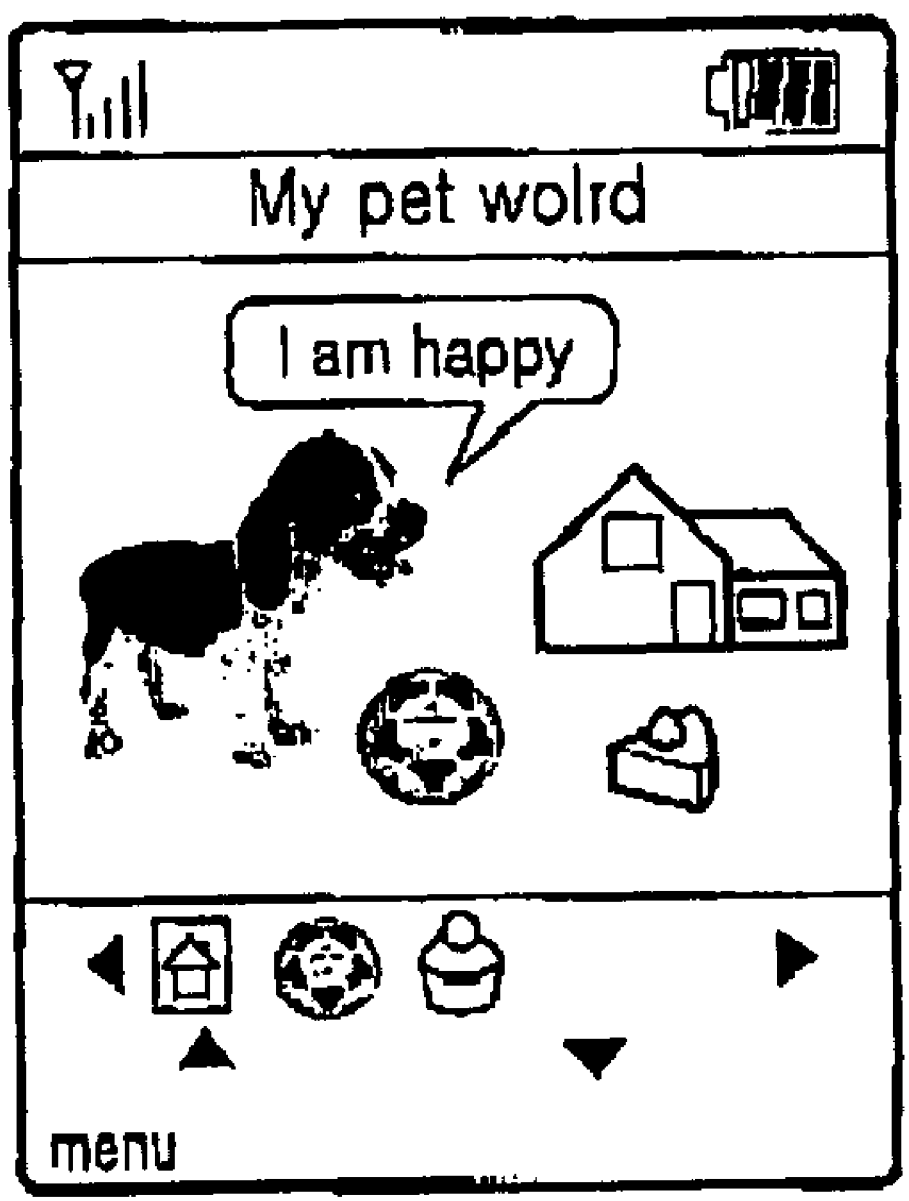
FIG. 12B is a non-limiting example of an emotional expression "I am happy" that the agent performs in a mobile phone.

FIG. 12B shows a non-limiting example of an emotional expression "I am happy" that the agent performs in a mobile phone.

Example 3

User Interactions with the Present Invention

This example is described with regard to a plurality of representative, non-limiting, illustrative screenshots, in order to provide an optional but preferred embodiment of the system of the present invention as it interacts with the user.

Figure 13:
FIG. 13 is an exemplary screenshot of the "floating agent", which is the creature or avatar (visual expression of the intelligent agent)
Figure 14:
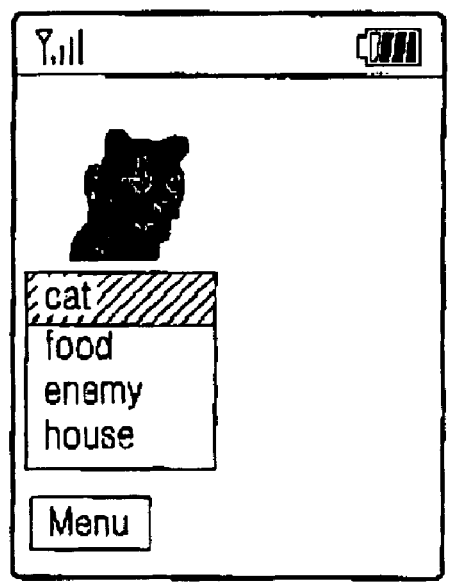
FIG. 14 is an exemplary screenshot of a menu for selecting objects for the intelligent agent's virtual world.

FIG. 13 is an exemplary screenshot of the "floating agent", which is the creature or avatar (visual expression of the intelligent agent). FIG. 14 is an exemplary screenshot of a menu for selecting objects for the intelligent agent's virtual world.

Figure 15:
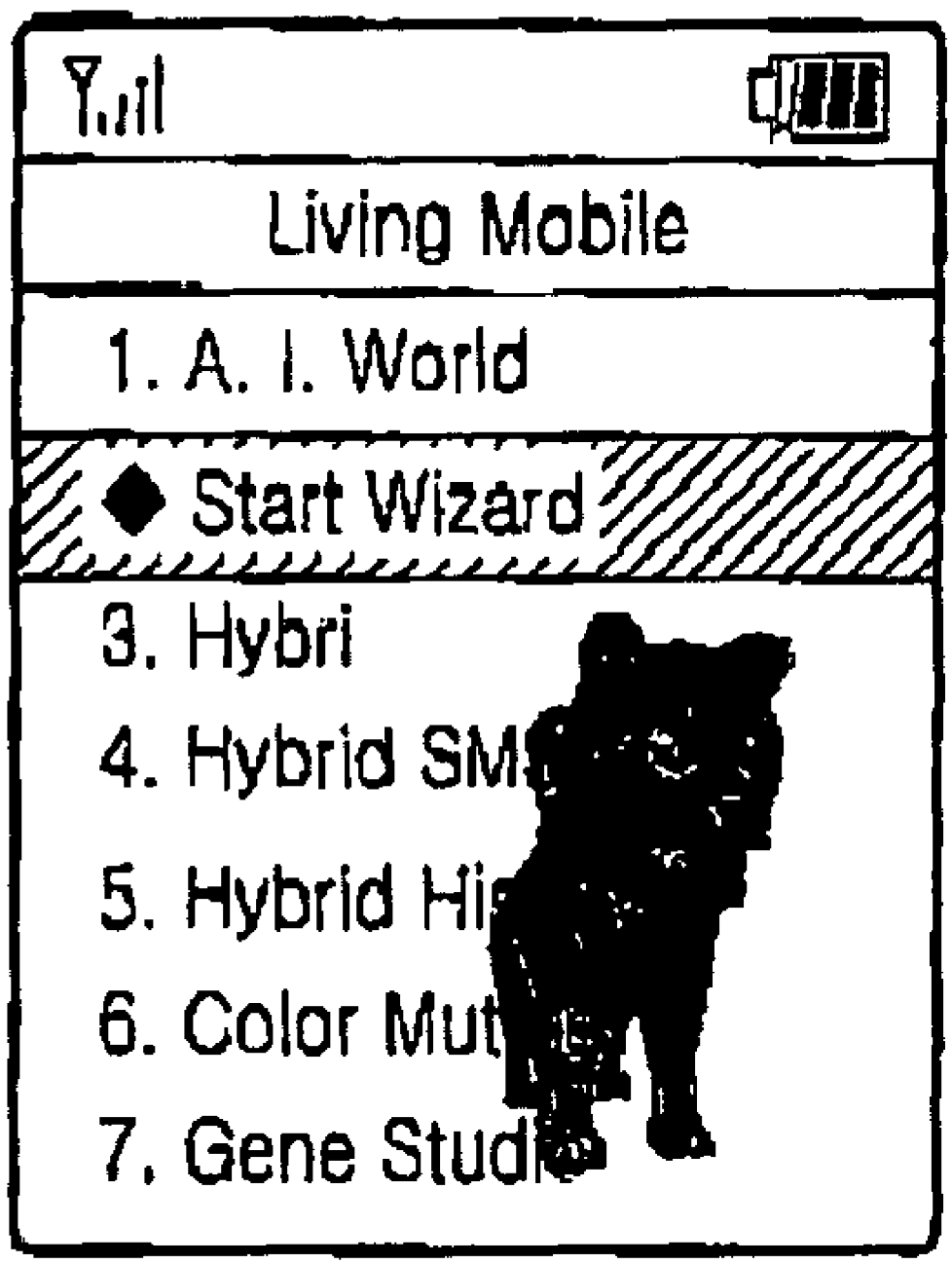
FIG. 15 is the Start Wizard application, which allows the user to configure and modify the agent settings, as well as user preferences.

FIG. 15 is the Start Wizard application, which allows the user to configure and modify the agent settings, as well as user preferences.

One example of an action to be performed with the wizard is to Set Personality, to determine settings for the emotional system of the intelligent agent. Here, the user can configure the creature's personality and tendencies.

The user can determine the creature's setting by pressing the right arrow key in order to increase the level of the characteristic and in order to do the opposite and decrease the level of the various characteristics such as Enthusiasm, Sociability, Anti_social behavior, Temper (level of patience), Melancholy, Egoistic behavior, and so forth.

The user is also able to set User Preferences, for example to determine how quickly to receive help. Some other non-limiting examples of these preferences include: communication (extent to which the agent communicates); entertain_user (controls agent playing with the user); entertain_self (controls agent playing alone); preserve_battery (extends battery life); and transparency_level (the level of the transparency of the creature).

The user can also set User Details with the start wizard, including but not limited to, user name, birthday (according to an optional embodiment of the present invention, this value is important in Hybrid SMS since it will define the konghup possibility between users, which is the ability to create a hybrid with a favorable astrology pattern; the konghup option is built according to suitable tables of horoscopes and dates), and gender. Here, the "konghup" (also caller "goong-hap") is a Korean word used to describe marital harmony as predicted by a fortuneteller, and the konghup possibility can be defined as the possibility of a favorable astrology pattern fro interpersonal relationship.

The user can also preferably set Creature Details.

The animations that the creature can perform optionally include but are not limited to, walking, sitting, smelling, flying, and jumping.

While the invention has been described with respect to a limited number of embodiments, it will be appreciated that many variations, modifications and other applications of the invention may be made.

What is claimed is:

1. A proactive user interface in combination with a computational device having an operating system, the proactive user interface comprising:
    (a) an interface unit for communicating between a user of the proactive user interface and said operating system, said interface unit including an emotional agent for communicating with the user;
    (b) at least one software application controlled by the operating system;
    (c) an artificial intelligence (AI) framework for supporting said at least one software application, communicating with a host platform having the operating system, detecting at least one pattern of interaction of the user with said interface unit, actively suggesting, to the user, options for altering at least one function of the user interface according to said detected pattern, and altering at least one function of the user interface according to an option selected by the user among the suggested options; and
    (d) a knowledge base for storing information selected from the group consisting of a pattern determined according to at least one previous interaction of the user with said interface unit, a predetermined pattern, and a combination thereof, wherein said agent expresses at least one emotion according to a reaction of the user to said suggestion, and wherein said proactive user interface anticipates requests of the user and assists the user in selecting a desired function of the computational device.

2. The combination of claim 1, wherein said AI framework comprises:
- an artificial intelligence/machine learning (AI/ML) module;
- an application manager for communicating with said at least one software application; a storage manager for managing storage and handling of data with regard to the knowledge base;
- an action manager for enabling the proactive user interface to determine which action to take through an operation of the AI/ML module;
- a user interface (UI) manager for managing an appearance and a function of the user interface by directing changes to the user interface; and
- a device world mapper for determining a state of the computational device, a state of a virtual world, and relationship between said two states.

3. The combination of claim 2, wherein said AI/ML module determines a behavior of the proactive user interface in response to various stimuli, and enables the proactive user interface to learn from a response of the user to different types of actions of the proactive user interface.

4. The combination of claim 3, wherein said AI framework further comprises an event handler, and between said at least one software application and said event handler, a plurality of different low level managers support receipt and handling of different events, said low level managers including the action manager, the UI manager, the storage manager, and the application manager.

5. The combination of claim 3, wherein the application manager is capable of starting, pausing, resuming and stopping each of said at least one software application.

6. The combination of claim 2, wherein said AI framework further comprises an event handler, and between said at least one software application and said event handler, a plurality of different low level managers support receipt and handling of different events, said low level managers including the action manager, the UI manager, the storage manager, and the application manager.

7. The combination of claim 1, wherein said computational device is selected from the group consisting of a regular computer, an ATM, mobile information devices including a cellular telephone, a PDA, and a consumer appliance having an operating system.

8. The combination of claim 7, wherein said agent is created through a 3D graphic model.

9. The combination of claim 8, wherein said proactive user interface controls the avatar to be displayed independently of visual display aspects of the user interface.

10. The combination of claim 1, wherein said intelligent agent communicates with an object in a virtual environment.

11. The combination of claim 10, wherein said object in the virtual environment includes at least one of a ball, an animal, food, a house, and toys.

12. The combination of claim 11, wherein said object in the virtual environment includes a graded input to a state of said agent.

13. The combination of claim 12, wherein said object in the virtual environment becomes an incentive or disincentive for said agent to continue a behavior for which feedback has been provided.

14. The combination of claim 12, wherein said graded input includes reward points provided to the agent, and the agent responds to the reward points.

15. The combination of claim 1, wherein said suggestion is determined by a rule based strategy.

16. The combination of claim 15, wherein said rule based strategy comprises:
- querying a knowledge base when an event occurs, and receiving a response therefrom;
- determining whether the event is valid or not;
- generating an action corresponding to the event and determining priority for the action; and
- performing a highest priority action from among actions corresponding to the event.

17. The combination of claim 16, wherein the highest priority action is an action that maximizes an aggregated total reward from a virtual environment or a graded input in the form of encouraging or discouraging feedback.

18. The combination of claim 15, wherein the proactive user interface creates an emotion of the agent based on a change of at least one of a likelihood of success (LOS) and a likelihood of failure (LOF) of an abstract goal of the agent.

19. The combination of claim 18, wherein the created emotion is accumulated, and the agent expresses an emotional state each time a dominant behavior pattern changes.

20. The combination of claim 19, wherein the emotional state is expressed using at least one of textual communication, three dimensional animation, facial expressions, two dimensional animated effects and sounds.

21. The combination of claim 19, wherein the emotional state is expressed using at least one of textual communication, three dimensional animation, facial expressions, two dimensional animated effects and sounds.

22. The combination of claim 19, wherein the emotional state is expressed using at least one of textual communication, three dimensional animation, facial expressions, two dimensional animated effects and sounds.

* * * * *